US006656090B2

United States Patent
Matsumura et al.

(10) Patent No.: US 6,656,090 B2
(45) Date of Patent: Dec. 2, 2003

(54) CONTROL METHOD AND SYSTEM FOR VEHICLE

(75) Inventors: Tetsuo Matsumura, Hitachinaka (JP); Hiroshi Sakamoto, Hitachi (JP); Mitsuo Kayano, Hitachi (JP); Tatsuya Ochi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,403

(22) Filed: Feb. 27, 2001

(65) Prior Publication Data

US 2002/0006851 A1 Jan. 17, 2002

(30) Foreign Application Priority Data

Jul. 17, 2000 (JP) .................................. 2000-216460

(51) Int. Cl.[7] ............................................... B60K 41/02
(52) U.S. Cl. ........................ 477/171; 477/175; 477/173
(58) Field of Search ................................ 477/175, 181, 477/171, 173, 83, 84, 74; 192/53.35, 3.58, 3.63

(56) References Cited

U.S. PATENT DOCUMENTS

| | | | |
|---|---|---|---|
| 4,449,416 A | * | 5/1984 | Huitema .................. 192/103 R |
| 4,653,621 A | * | 3/1987 | Oshiage ...................... 477/175 |
| 5,314,050 A | * | 5/1994 | Slicker et al. ............... 477/171 |
| 5,322,150 A | | 6/1994 | Schmidt-Brueken et al. |
| 5,487,004 A | * | 1/1996 | Amsallen ................... 192/3.58 |
| 5,508,916 A | * | 4/1996 | Markyvech et al. ........ 192/3.55 |
| 5,517,411 A | * | 5/1996 | Genise et al. .......... 123/198 DB |
| 5,678,674 A | | 10/1997 | Nehse |
| 5,913,377 A | * | 6/1999 | Ota et al. .................... 180/197 |
| 5,941,792 A | * | 8/1999 | Amendt et al. ................ 477/74 |
| 6,227,999 B1 | * | 5/2001 | Wheeler ...................... 477/174 |

FOREIGN PATENT DOCUMENTS

| | | |
|---|---|---|
| DE | 19726214 | 12/1998 |
| EP | 0707998 | 4/1996 |
| EP | 1072459 | 1/2001 |
| GB | 2066919 | 7/1981 |
| JP | A 60-11720 | 1/1985 |

* cited by examiner

Primary Examiner—Charles A Marmor
Assistant Examiner—David D. Le
(74) Attorney, Agent, or Firm—Crowell & Moring LLP

(57) ABSTRACT

A method for controlling a vehicle having a first clutch mounted between an engine and a gear drive transmission, and dog clutch type torque transmission means disposed between an input shaft and an output shaft of the gear drive transmission, and wherein the first clutch is controlled at starting the vehicle or at gear shifting, comprising the steps of controlling a transmission torque of the first clutch based on a difference between the engine speed/revolution speed of the input shaft at starting the vehicle so as to control a quantity of increase in a transmission torque of the first clutch in accordance with the value of the difference; and controlling the engine torque based on the transmission torque of the first clutch so as to increase the engine torque according to an increase in the transmission torque of the first clutch.

10 Claims, 25 Drawing Sheets

CONTROL METHOD AND SYSTEM FOR VEHICLE

BACKGROUND OF THE INVENTION

The present invention relates to a method and a system for controlling the automatic transmission of an automotive vehicle.

The manual-shifted transmission is superior in fuel economy to the automatic transmission using a torque converter, but has difficulty in a coordinated operation between the clutch and the accelerator at starting an automotive vehicle. If the operation of the accelerator and the clutch at starting the vehicle is not coordinated properly, a great shock occurs when the clutch is engaged, or if the clutch pressure is not sufficient, the engine speed rises sharply, giving rise to a so-called surging. If one tries to engage the clutch abruptly while the engine speed is not high enough or if a car starts on an uphill, the engine will stall.

To solve those problems, efforts are now underway to develop an automated system of clutch operation and gear change by using the mechanism of a manual-shifted transmission, namely, an automatic MT (automatic manual transmission). With respect to clutch control at starting the vehicle, a technique has been disclosed in JP-A-60-11720, for example.

SUMMARY OF THE INVENTION

In control of starting or shifting gears with the automatic MT, changes in acceleration caused by releasing and engaging the clutch at starting the vehicle give the occupants discomfort.

A vehicle with an automatic MT transmission has no creep torque, because the clutch for transmitting the driving force from the engine output shaft is in the released condition when the shift lever is in the drive range in contrast to a conventional AT vehicle and provides a lower starting performance than the AT vehicle at starting.

An object of the present invention is to suppress changes in acceleration both at starting and gear shifting by controlling the clutch for transmitting the driving force from the engine output shaft to thereby improve gear-shifting performance.

Another object of the present invention is to produce a creep torque when starting an automotive vehicle to thereby obtain a better starting performance.

According to an aspect of the present invention, a method for controlling an automotive vehicle having a first clutch, mounted between an engine and a gear drive transmission, for connecting or disconnecting torque transmitted from the engine to driving wheels, and torque transmission units disposed between an input shaft and an output shaft of the gear drive transmission, wherein the torque transmission units are of the dog clutch type, and wherein the first clutch is controlled at starting the vehicle or at gear shifting, comprises the steps of controlling the first clutch transmission torque based on a difference between the engine speed and the revolution speed of the transmission input shaft at starting the vehicle, and controlling the engine torque based on the first clutch transmission torque.

According to another aspect of the present invention, a control system for an automotive vehicle having a first clutch, mounted between an engine and a gear drive transmission, for connecting or disconnecting torque transmitted from the engine to the driving wheels, and torque transmission units disposed between an input shaft and an output shaft of the gear drive transmission, wherein the torque transmission units are of the dog clutch type, and wherein the first clutch is controlled at starting the vehicle or at gear shifting, comprises a clutch control unit for controlling the first clutch transmission torque based on a difference between the engine speed and the revolution speed of the transmission input shaft at starting the vehicle, and an engine torque control unit for controlling the engine torque of the first clutch controlled by the clutch control unit.

According to a further aspect of the present invention, changes in acceleration can be suppressed at starting a vehicle or at gear shifting by controlling the clutch for transmitting the driving force from the output shaft of the engine to thereby improve the gear shifting performance.

According to yet another aspect of the present invention, a control system for an automotive vehicle having a first clutch, mounted between an engine and a gear drive transmission, for connecting or disconnecting torque transmitted from the engine to the driving wheels, and torque transmission units disposed between an input shaft and an output shaft of the gear drive transmission, wherein the torque transmission units are of the dog clutch type, and wherein the first clutch is controlled at starting the vehicle or at gear shifting, comprises a driver's will-detecting unit for detecting a request for starting and acceleration, a request for deceleration and stoppage, or a request for shifting gears; a creep control completion decision unit for deciding whether creep torque generation has been finished or not; and a creep torque generating unit, wherein when the driver's will detection unit detects brake releasing, the first clutch enters a slipping-engagement state, making the driving force to be transmitted to cause the vehicle to move and when the creep control completion decision unit decides that creep torque generation has been finished, the creep torque generating unit releases the slipping-engagement of the first clutch.

According to a still further aspect of the present invention, a better starting performance by generation of creep torque can be obtained, and the temperature increase and deterioration of the clutch caused by continuance of slips can be avoided.

DESCRIPTION OF THE EMBODIMENTS

Preferred embodiments of the present invention will be described with reference to the accompanying drawings.

Figure 1:
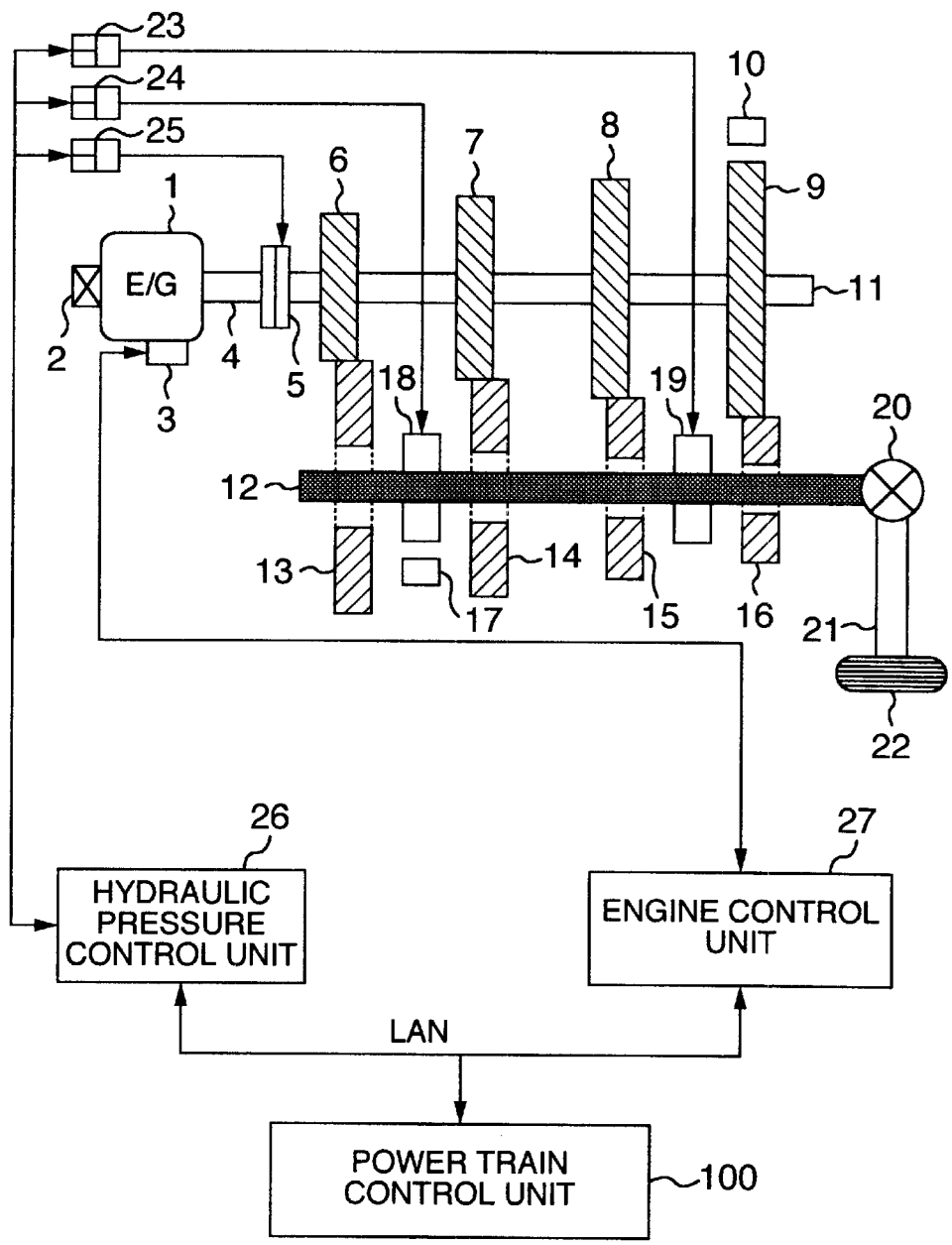
FIG. 1 is a general block diagram of an automatic transmission according to a first embodiment of the present invention.

FIG. 1 is a block diagram showing a first embodiment of a control method and a control system of an automatic transmission according to the present invention.

The engine 1 includes an engine speed sensor 2 for measuring revolution speed of the engine Ne and an electronic controlled throttle 3 for adjusting engine output torque, which make it possible to control the engine torque with high accuracy. More specifically, at the engine 1, the intake air flow is controlled by the electronic controlled throttle 3 mounted at an intake pipe (not shown), and a quantity of fuel matched with the intake air flow is injected by a fuel injection system (not shown). In the engine 1, ignition is made to take place by an ignition system (not shown) at ignition timing determined by signals, such as the fuel/air ratio based on the intake air flow and the injection quantity and the engine speed Ne. Among the fuel injection systems, there are the intake port injection system that injects fuel into the intake port and the cylinder injection system that directly injects fuel into the cylinder. It is advantageous to use a type of engine with less fuel consumption and good emission control by comparing operating ranges (determined by engine torque and engine speed) required of the engine.

The engine 1 has attached to its output shaft a first clutch 5 by which the torque of the engine 1 can be transmitted to the input shaft 11 of the transmission. For the first clutch 5, a dry type single plate clutch is generally used, but any of friction clutches, such as a multiplate wet clutch or a electro-magnetic clutch, may be used. A first drive gear 6, a second drive gear 7, a third drive gear 8, and a fourth drive gear 9 are mounted on the input shaft 11. To control the pressing force (clutch torque) of the first clutch 5 against a flywheel, a hydraulically-driven actuator 25 is used. By adjusting this pressing force (clutch torque) of the first clutch 5, the flow of power from the output shaft 4 of the engine 1 to the input shaft 11 of the transmission can be passed or interrupted. The first clutch 5 is engaged when no pressure is supplied from the actuator 25. Hereinafter, the term "a position (or stroke) of the clutch" means a stroke position of a hydraulic cylinder of the actuator which drives the clutch.

The first drive gear 6, the second drive gear 7, the third drive gear 8 and the fourth drive gear 9 are fixed to the input shaft 11. The fourth drive gear 9 is used to detect the input shaft revolution speed Nin. For this purpose, near the fourth drive gear 9, a sensor 10 is provided for detecting the revolution speed Nin of input shaft 11 by counting the number of revolutions of the fourth drive gear 9.

On the other hand, a first driven gear 13, a second driven gear 14, a third driven gear 15 and a fourth driven gear 16 are rotatably mounted on the transmission output shaft 12 connected to the driving wheels. The first driven gear 13 engages with the first drive gear 6, the second driven gear 14 engages with the second drive gear 7, the third driven gear 15 engages with the third drive gear 8, and the fourth driven gear 16 engages with the fourth drive gear 9.

Provided between the first driven gear 13 and the second driven gear 14 is a second clutch (called a dog clutch or a claw clutch) 18 with a synchronizer mechanism for connecting the first driven gear 13 or the second driven gear 14 to the output shaft 12 to the driving wheels. The first driven gear 13 and the second driven gear 14 are each provided with a stopper (not shown) to prevent them from moving in the axial direction of the transmission output shaft 12. The second clutch 18 has formed therein grooves (not shown) engaging with a plurality of grooves (not shown) formed in the transmission output shaft 12, along which grooves the second clutch 18 can move in the axial direction of the driving wheels output shaft 12, but the second clutch 18 is configured to limit its movement in the rotational direction of the transmission output shaft 12. Therefore, the rotating torque transmitted from the first drive gear 6 or the second drive gear 7 to the first driven gear 13 or the second driven gear 14 is transmitted to the second clutch 18 and through the second clutch 18 to the transmission output shaft 12.

Provided between the third driven gear 15 and the fourth driven gear 16 is a third clutch (called a dog clutch or a claw clutch) 19 with a synchronizer mechanism for connecting the third driven gear 15 or the fourth driven gear 16 to the output shaft 12 to the driving wheels. The third driven gear 15 and the fourth driven gear 16 are each provided with a stopper (not shown) to prevent them from moving in the axial direction of the transmission output shaft 12. The third clutch 19 has formed therein grooves (not shown) engaging with a plurality of grooves (not shown) formed in the transmission output shaft 12, along which grooves the third clutch 19 can move in the axial direction of the transmission output shaft 12, but the third clutch 19 is configured to limit its movement in the rotational direction of the transmission output shaft 12. Therefore, the rotating torque transmitted from the third drive gear 8 or the fourth drive gear 9 to the third driven gear 15 or the fourth driven gear 16 is transmitted to the third clutch 19 and through the third clutch 19 to the transmission output shaft 12.

To transmit the rotating torque of the input shaft 11 to the second clutch 18, it is necessary to move the second clutch 18 in the axial direction of the transmission output shaft 12 to cause the second clutch to engage the first driven gear 13 or the second driven gear 14. To connect the first driven gear 13 or the second driven gear 14 to the transmission output shaft 12, the second clutch 18 needs to be moved. To move the second clutch 18, an actuator 24, which is hydraulically driven, is used. By connecting the second clutch 18 to the first driven gear 13 or the second driven gear 14, the rotating torque of the input shaft 11 can be transmitted to the transmission output shaft 12 through the second clutch 18. Note that the second clutch 18 is used to detect the revolution speed No of the transmission output shaft 12 and a sensor 17 is provided near the second clutch 18 to detect the revolution speed of the output shaft 12.

To transmit the rotating torque of the input shaft 11, it is necessary to move the third clutch 19 in the axial direction of the transmission output shaft 12 to connect the third clutch 19 to the third driven gear 15 or the fourth driven gear 16. To connect the third driven gear 15 or the fourth driven gear 16 to the transmission output shaft 12, the third clutch 19 needs to be moved. To move the third clutch 19, a hydraulically-driven actuator 23, which provides hydraulic pressure, is used. By connecting the third clutch 19 to the third driven gear 15 or the fourth driven gear 16, the rotating torque of the input shaft 11 can be transmitted through the third clutch 19 to the transmission output shaft 12.

Thus, passing from the first drive gear 6, the second drive gear 7, the third drive gear 8 or the fourth drive gear 9 through the first driven gear 13, the second driven gear 14, the third driven gear 15 or the fourth driven gear 16, the rotating torque of the input shaft 11 transmitted to the output shaft 12 and further transferred through the differential gear 20 to the axle 21 to rotate the driving wheels 22.

The first clutch is driven by the actuator 25, the second clutch by the actuator 24 and the third clutch by the actuator 23. Each clutch is controlled by controlling the hydraulic pressure applied to the actuator by a hydraulic pressure control unit 26 and adjusting the stroke of the hydraulic cylinder (not shown) provided for the actuator. The electronic controlled throttle 3 is controlled in its opening angle by an engine control unit 27. The hydraulic pressure control unit 26 and the engine control unit 27 are controlled by a power train control unit 100. The hydraulic pressure control unit 26, the engine control unit 27, and the power train control unit 100 can each be realized by an ordinary computer which includes a CPU that operates by a program, a memory storing a control program and data, an input/output control unit, and a bus interconnecting those units.

Figure 2:
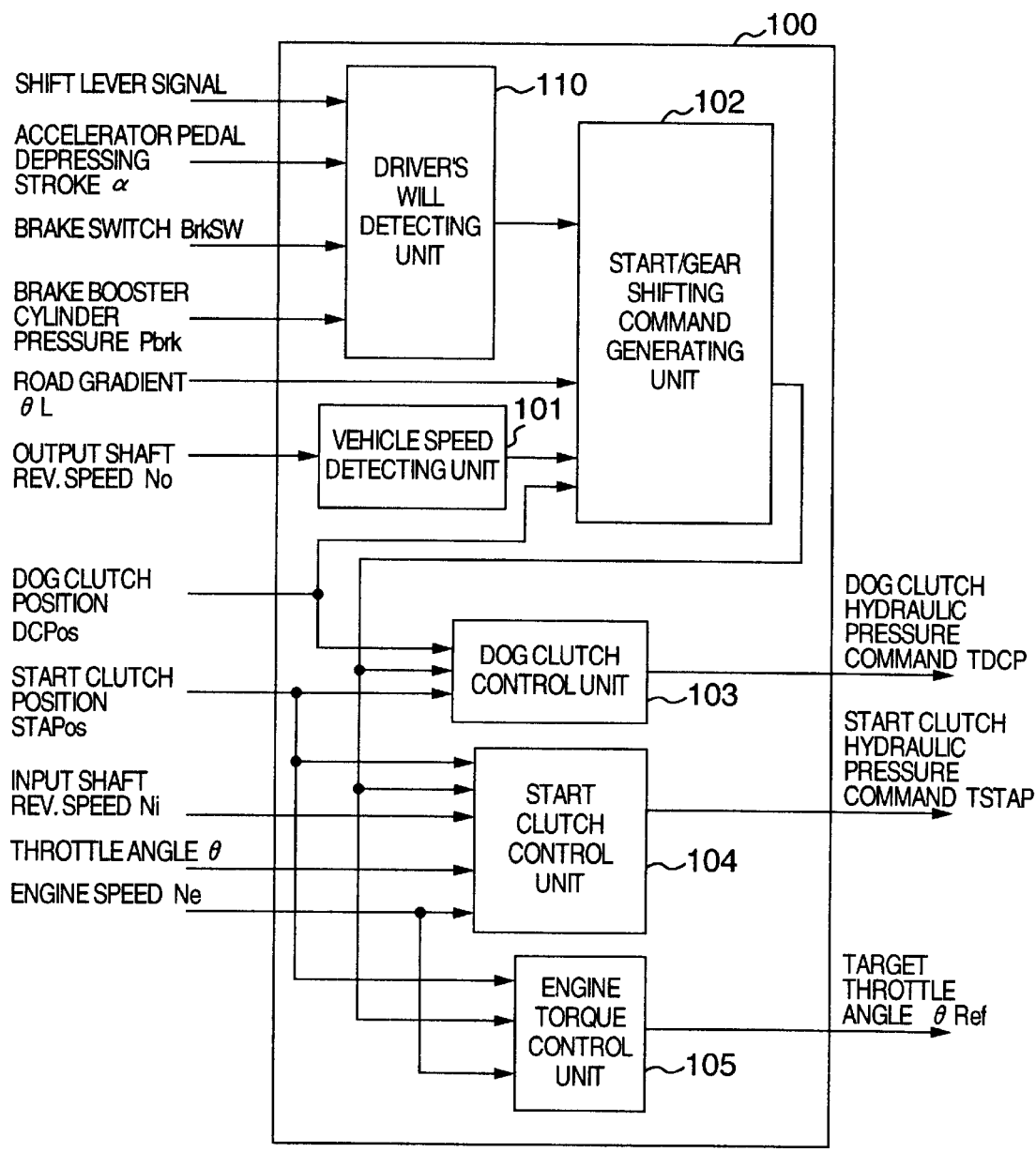
FIG. 2 is a block diagram of the power train control unit illustrated in FIG. 1.

The power train control unit 100, as shown in FIG. 2, comprises a vehicle speed detection unit 101, a start/gear shifting command generating unit 102, a dog clutch control unit 103, start clutch control unit 104, an engine torque control unit 105, and a driver's will detection unit 110.

The vehicle speed detection unit 101 receives the revolution speed signal No of the transmission output shaft 12 output from the sensor 17 and determines the vehicle speed. The driver's will detection unit 110 receives signals representing shift-lever positions, such as P-range, R-range, N-range, D-range, the accelerator pedal depressing stroke α, on/off signals from the brake switch that detects whether or not the brake pedal is depressed, and also receives the cylinder pressure value of the brake booster to thereby detect the driver's desired running condition. More specifically, to take an example, when the driver selects the D-range or any other forward position and pushes down the accelerator pedal, the driver's will detection unit 110 decides that the driver intends to start or accelerate. Or, when the brake pedal is depressed, the unit decides that the driver is going to decelerate or bring the car to a stop.

The start/gear shifting command generating unit 102 receives a signal representing the driver's will (to start and accelerate or decelerate and come to a stop) from the driver's will detection unit 110, a signal value showing a road gradient detected by a road gradient detection sensor, a vehicle speed value from the vehicle speed detection unit 101 and dog clutch position signals from the sensors detecting positions of the second clutch 18 and the third clutch 19, and the command generating unit 102 outputs a signal of a start command or a gear shifting command. When the start/gear shifting command generating unit 102 outputs a start command or a gear shifting command, this command value is input to the dog clutch control unit 103, the start clutch control unit 104, and the engine torque control unit 105.

The dog clutch control unit 103 receives dog clutch position signals from sensors that detect the positions of the second clutch 18 and the third clutch 19 and a signal showing the position (the stroke positions of the hydraulic cylinders of the actuators 24 and 23) of the start clutch (first clutch 5) and outputs a hydraulic pressure control command value to control the hydraulic pressure to the actuator 24 or 23 to drive the second clutch 18 or the third clutch 19 in response to a start command or a gear shifting command from the start/gear shifting command generating unit 102. The dog clutch control unit 103 controls engaging and releasing of the second clutch 18 or the third clutch 19 by driving the actuator 24 or 23 in response to a start command or a gear shifting command from the start/gear shifting command generating unit 102.

The start clutch control unit 104, when a command signal from the start/gear shifting command generating unit 102 is a start signal, receives a dog clutch position signal output from the sensors that detect where the second clutch 18 and the third clutch 19 are located, the revolution speed Ni of the input shaft of the transmission from the sensor 10, a throttle opening angle from the throttle angle sensor, the engine speed Ne from the engine speed sensor 2, and a signal showing the position (the stroke of the hydraulic cylinder) of the start clutch (first clutch 5), and outputs a driving hydraulic pressure command value of the actuator 25 to control engaging, slipping and releasing of the start clutch (first clutch 5) at starting the vehicle, derived from the input data mentioned above. The start clutch control unit 104, when the command signal from the start/gear shifting command generating unit 102 is a gear shifting command, receives dog clutch position signals from the sensors detecting the positions of the second clutch 18 and the third clutch 19, the revolution speed Ni of the input shaft of the transmission output from the sensor 10, a throttle angle value output from the throttle angle sensor, the engine speed Ne output from the engine speed sensor 2, and a signal showing the position (the stroke of the hydraulic cylinder) of the start clutch (first clutch 5), and outputs a driving hydraulic pressure command value of the actuator 25 to control engaging, slipping and releasing of the start clutch (first clutch 5) at gear shifting from the input data mentioned above.

The engine torque control unit 105 outputs a target throttle angle based on the position of the start clutch (first clutch 5), the engine speed Ne output from the engine speed sensor 2, a throttle angle value output from the throttle angle sensor, and a start command at starting a vehicle or a gear shifting command at gear shifting output from the start/gear shifting command generating unit 102.

With reference to FIGS. 3 to 6, description will be made of control performed when the start clutch (first clutch 5) is engaged at starting the vehicle.

Figure 3:
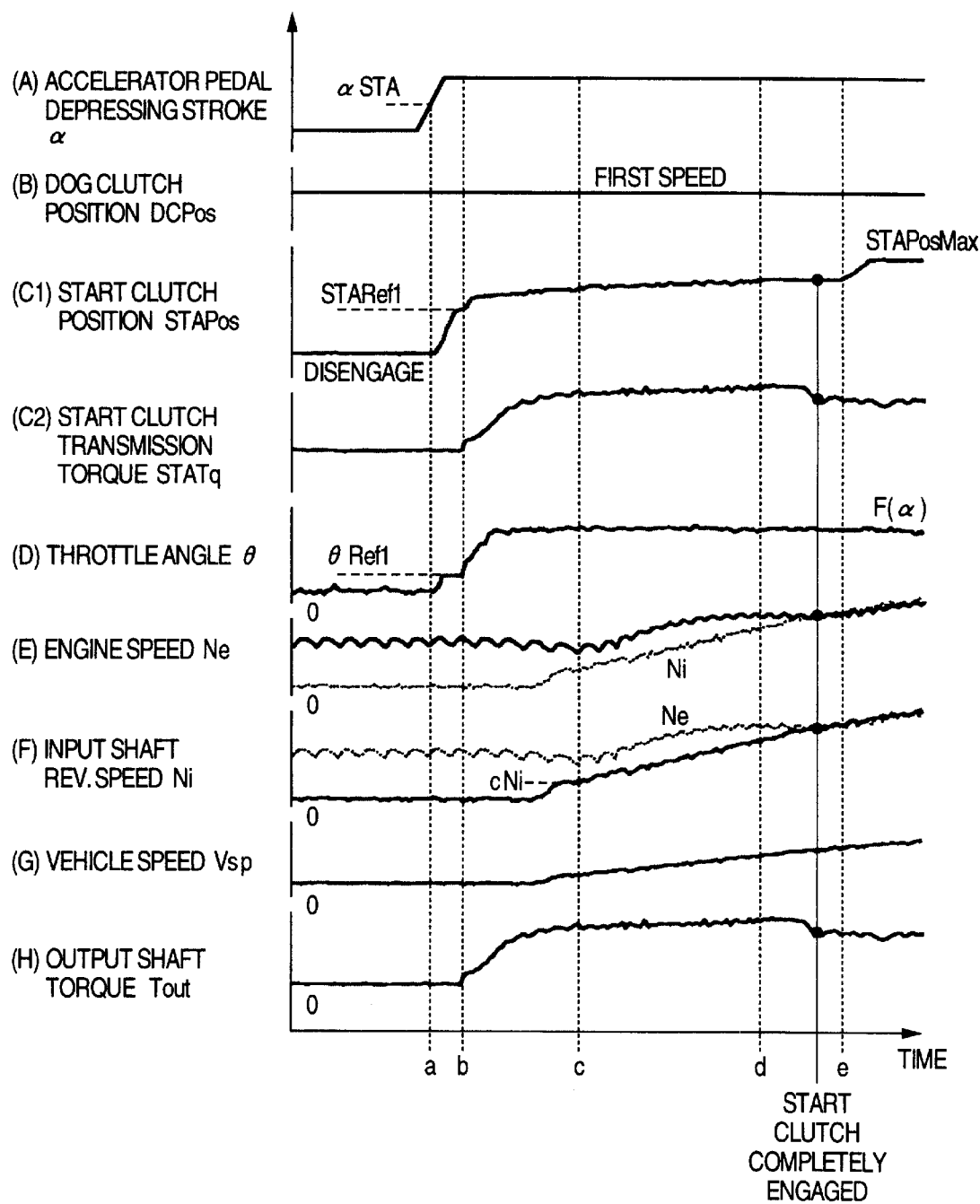
FIG. 3 is a time chart of control when engaging the start clutch at starting a vehicle.
Figure 4:
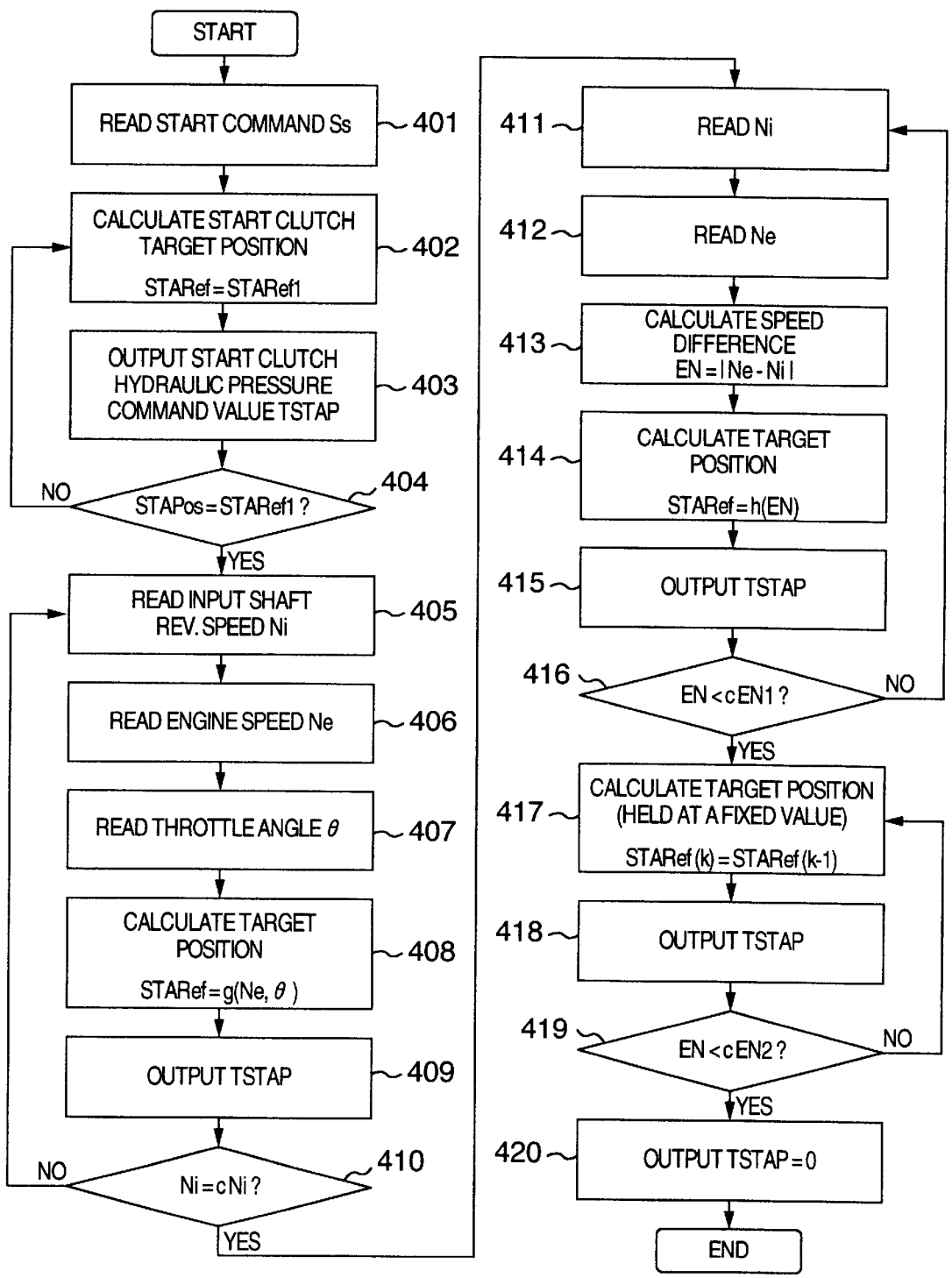
FIG. 4 is a flowchart of control when engaging the start clutch at starting a vehicle.
Figure 5:
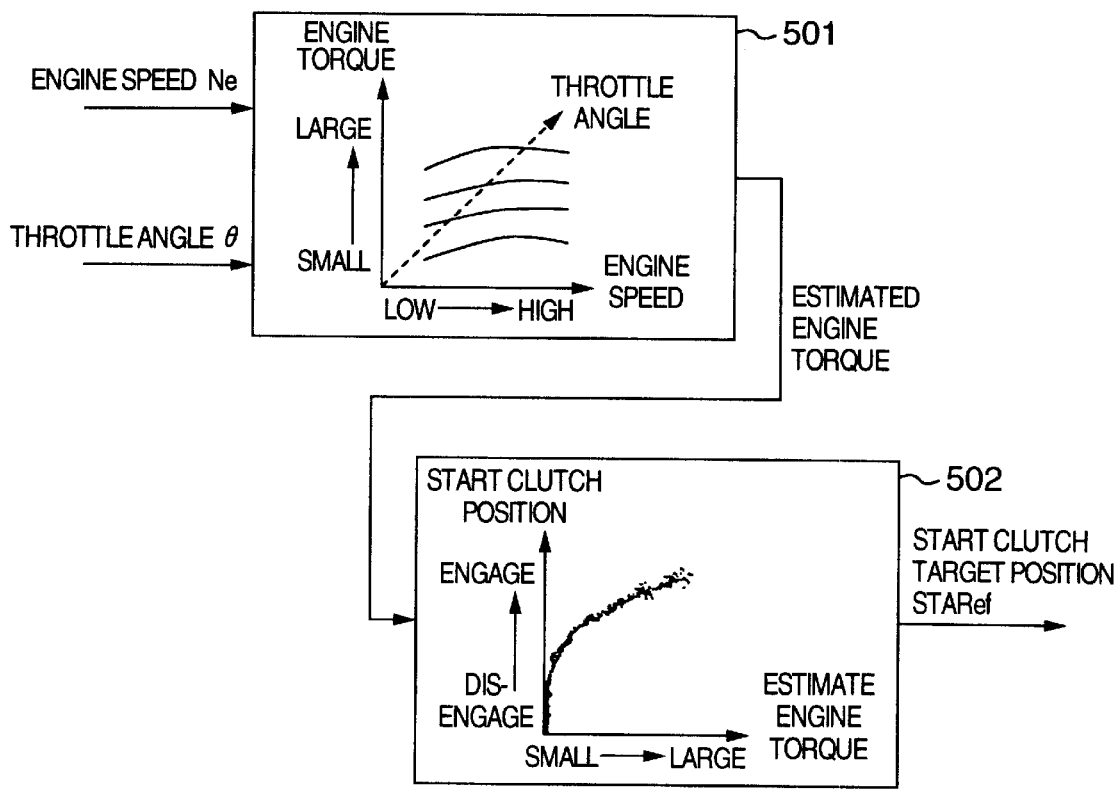
FIG. 5 is a diagram for explaining a method for detecting a target position of the start clutch.
Figure 6:
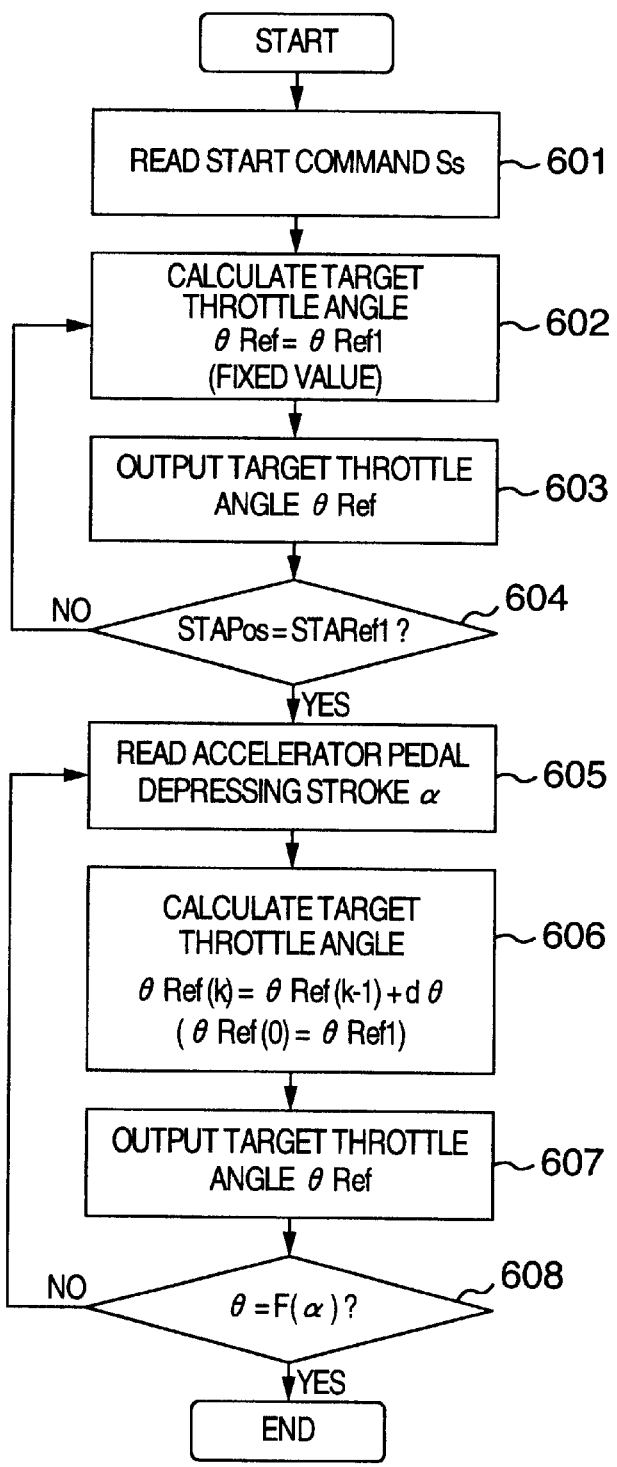
FIG. 6 is a flowchart of control of the throttle valve when engaging the start clutch.

FIG. 3 is a time chart of control when engaging the start clutch (first clutch 5) at starting, FIG. 4 is a flowchart of control when engaging the start clutch at starting, FIG. 5 is a diagram for explaining a method for detecting a target position of the start clutch, and FIG. 6 is a flowchart of control of the throttle valve when engaging the start clutch.

In FIG. 3, the shift lever is in the drive range (D), the engaged second clutch 18 is connected to the first driven gear 13 (first-speed driven gear), and the start clutch (first clutch 5) has been released. The accelerator pedal is depressed under this condition and the throttle opening angle is controlled so as to come to a target throttle angle (θRef1) when the depressing stroke of the accelerator pedal reaches a specified value (αSTA at the time point a), and simultaneously the stroke starts to change till the start clutch (first clutch 5) is engaged (the start clutch position moves). The throttle angle is held at a target throttle angle (θRef1) temporarily. When the start clutch (first clutch 5) starts to enter an engagement phase (slipping state) at time b, the start clutch transmission torque starts to rise. Simultaneously with this, the output torque Tout of the transmission output shaft 12 starts to rise.

When the start clutch (first clutch 5) starts to enter an engagement process (slipping state) at time b, the throttle valve again starts to open and reaches a specified angle. During a period from time b till time c (when the input shaft revolution number Ni reaches a specified value cNi), the transmission torque of the start clutch (first clutch 5) is controlled based on the torque of the engine 1. In other words, an estimated engine torque at the moment is obtained by an engine speed Ne from the engine speed sensor 2 and a throttle angle using an estimated engine torque map 501 that gives estimated engine torque values for engine speed Ne determined by throttle angles as shown in FIG. 5. A start clutch target position (the target position of the first clutch stroke) is obtained from the estimated engine torque value previously obtained on the estimated engine torque map 501 by using a characteristics map 502 in FIG. 5 showing start clutch positions (first clutch stroke positions) for estimated engine torque values, the stroke position of the first clutch 5 is changed by controlling the oil pressure of the actuator 25 so that the stroke target position is reached.

During a period from time c to time d (when a difference between an engine speed Ne and the input shaft revolution speed Ni reaches a specified value), the transmission torque of the start clutch is controlled by feedback in accordance with the difference between the engine speed Ne and the revolution speed Ni of the input shaft 11, and the engine torque is controlled (by the engine torque control unit 105) based on the start clutch transmission torque. In other words, the start clutch transmission torque is controlled by a difference between the engine speed Ne and the revolution speed Ni of the input shaft 11 as a feedback value so that the difference between the engine speed Ne and the input shaft revolution speed Ni comes to a specified value. In this feedback control, the stroke movement of the start clutch, that is, the first clutch 5 (or the start clutch position) is controlled so that the speed Ni of the input shaft 11 comes closer to the engine speed Ne until the difference between the engine speed Ne and the input shaft speed Ni reaches a specified value. This feedback control is carried out to enlarge an amount of increase in the transmission torque of the start clutch when the revolution difference (EN) between the engine speed Ne and the input shaft revolution speed Ni is large, or reduce an amount of increase in start clutch target position (STARef1) when the revolution difference (EN) is small.

This control is repeated by obtaining a revolution difference between an engine speed Ne from the engine speed sensor 2 and a revolution speed Ni of the input shaft 11 from the sensor 10 until this difference becomes equal to a specified value (at time d). At this time, the engine speed Ne should increase as the throttle valve starts to open, but because the first clutch 5 is gradually engaged and load on the engine increases by degrees, so that the both revolution speeds are kept substantially at the same level. Meanwhile, the revolution speed Ni of the input shaft 11 increases little by little as the first clutch 5 is gradually engaged. The vehicle speed Vsp also increases in proportion to the increase in the revolution speed Ni of the input shaft 11. In addition, the output torque Tout of the transmission output shaft 12 starts to rise from when the first clutch 5 starts to be engaged (at time b), and becomes stable about a time when the revolution difference between the engine speed Ne and the input shaft revolution speed Ni reaches a certain value.

When the difference between the engine speed Ne and the revolution speed Ni of the input shaft 11 is equal to a specified value (at time d) by feedback control by the revolution difference, the engagement of the start clutch is controlled so that the start clutch transmission torque is in a specified range. The start clutch transmission torque can be controlled by controlling the length of stroke of the start clutch 5 (a stroke of the hydraulic cylinder of the actuator 25), or by controlling the oil pressure applied to the actuator 25 to drive the start clutch (first clutch 5). This control is repeated until it is confirmed that the first clutch 5 has been engaged (at time e). The fact that the first clutch 5 has been engaged is confirmed by the detection that the engine speed Ne has become equal to the input shaft revolution speed Ni.

After it has been confirmed (at time e) that the first clutch 5 is engaged, the oil pressure of the actuator 25 is released so as to engage the clutch 5 completely and the control for the start is finished.

Control carried out when engaging the first clutch 5 based on a time chart shown in FIG. 3 will next be described with reference to a flowchart in FIG. 4.

In FIG. 4, in a step 401, under the condition that the shift lever is placed in the drive range (D) and the first driven gear 13 (first-speed driven gear) is coupled with by the second clutch 18, if the accelerator pedal is depressed and a start command is output from the start/gear shifting command generating unit 102, in a step 402, a start clutch target position STARef is calculated as STARef=STARef1. After the start clutch target position is calculated in the step 402, in a step 403, a hydraulic pressure command value (TSTAP) of the actuator 25 controlling the stroke length of the first clutch 5 is calculated based on the start clutch target position obtained in the step 402 and is output. The hydraulic pressure command value (TSTAP) of the actuator 25 is used to control the stroke of the first clutch.

After in the step 403 the hydraulic pressure command value (TSTAP) of the actuator 25 is output, in the next step 404, a decision is made whether or not the position (STAPos) of the start clutch 5 has become equal to the start clutch target position (STARef1). The process enters a waiting state till the start clutch position (STAPos) is equal to the start clutch target position (STARef1), and if a decision is made in the step 404 that the start clutch position (STAPos) has reached the start clutch target position (STARef1), in a step 405, the revolution speed Ni of the input shaft 11 is read from the sensor 10. In a step 406, the engine speed Ne is read from the engine speed sensor 2, and in a step 407, the throttle opening angle $\theta$ is read.

In a step 408, the start clutch target position (stroke target position of the actuator 25 for the first clutch 5) is calculated from the engine speed Ne and the throttle angle $\theta$. In a step 409, the start clutch target position value calculated in the step 408 is output to the hydraulic pressure control unit 26. In a step 410, a decision is made whether or not the input shaft revolution speed Ni is a specified rpm (cNi). When a decision is made that the input shaft revolution speed Ni is equal to the specified value (cNi), in a step 411, the input shaft revolution speed Ni is read from the sensor 10, and then in a step 412, the engine speed Ne is read from the engine speed sensor 2. And, in a step 413, a revolution difference (EN) between the input shaft revolution speed Ni and the engine speed Ne is calculated, and in a step 414, from this revolution difference (EN), a start clutch target position (STARef1) is calculated. If the revolution difference (EN) between the engine speed Ne and the input shaft revolution speed Ni is large, the quantity of increase in start clutch target position (STARef1) is increased, and if the revolution difference (EN) is small, the quantity of increase in start clutch target position (STARef1) is reduced. After in the step 414 the start clutch target position is calculated, in a step 415, a hydraulic pressure command value (TSTAP) of the actuator 25 to control the stroke of the first clutch 5 is calculated based on the start clutch target position obtained in the step 414 and is output. The hydraulic pressure command value (TSTAP) for the actuator 25 is used to drive the actuator 25 and to control the length of stroke of the actuator 25 for the first clutch 5.

In a step 416, a decision is made whether or not the revolution difference (EN) is smaller than the first setting revolution speed (cEN1). If a decision is made in the step 416 that the revolution difference (EN) is smaller than the specified revolution speed (cEN1), in a step 417, a target position of the stroke to drive the first clutch is calculated, and in a step 418, a result of the calculation is output. In a step 419, a decision is made whether or not the revolution difference (EN) is smaller than the second setting revolution speed (cEN2). In the step 419, if a decision is made that the revolution difference (EN) is smaller than the second setting revolution speed (cEN2), in a step 420, "0" (hydraulic pressure is released) is output as the hydraulic pressure command value (TSTAP) for the actuator 25 to control the position of the stroke of the actuator 25 controlling the first clutch 5 is output.

FIG. 6 is a flowchart of control of the throttle valve when engaging the start clutch 5.

Referring FIG. 6, in a step 601, under the condition that the shift lever is in the drive range (D) and the first driven gear 13 (first-speed driven gear) is coupled with the second clutch 18, when the accelerator pedal is depressed and a start signal is output from the start/gear shifting command generating unit 102. In a step 602, the first opening angle of the throttle valve is calculated, a target throttle angle $\theta$Ref ($\theta$Ref1) is set by the engine torque control unit 105, and in a step 603, the target throttle angle $\theta$Ref set in the step 602 is output from the engine torque control unit 105 to the electronic controlled throttle 3. In a step 604, a decision is made whether or not the position (STAPos) of the start clutch (stroke of the actuator 25 driving the first clutch 5) is equal to the start clutch target position (STARef1), and if a decision is made that the position (STAPos) of the start clutch is equal to the start clutch target position (STARef1), in a step 605, the depressing stroke $\alpha$ of the accelerator pedal is read. In a step 606, the second target throttle angle $\theta$Ref(k), which is the sum of the target throttle angle $\theta$Ref and a specified throttle angle d$\theta$, is calculated as $\theta$Ref(k)= $\theta$Ref(k–1)+d$\theta$ by the engine torque control unit 105, and the second target throttle angle $\theta$Ref(k) calculated in the step 606 is output to the electronic controlled control unit 3. Note that the $\theta$Ref(k) is the current calculated value of the target throttle angle in a case where the arithmetic operation is carried out at fixed periods in the power train control unit 100, the $\theta$Ref(k–1) is the previous calculated value of the target throttle angle, and the d$\theta$ is an added amount at every fixed period. By carrying out calculations as mentioned above, the target throttle angle $\theta$Ref(k) can be controlled in a ramp form (rising the signal at a fixed gradient). Subsequently, in a step 608, a decision is made whether or not the throttle angle $\theta$ is equal to the second target throttle angle F($\alpha$), and if the throttle angle $\theta$ is equal to the second target throttle angle F($\alpha$), the process is terminated.

A clutch control performed when engaging the first clutch 5 at gear shifting will next be described with reference to FIG. 7.

Figure 7:
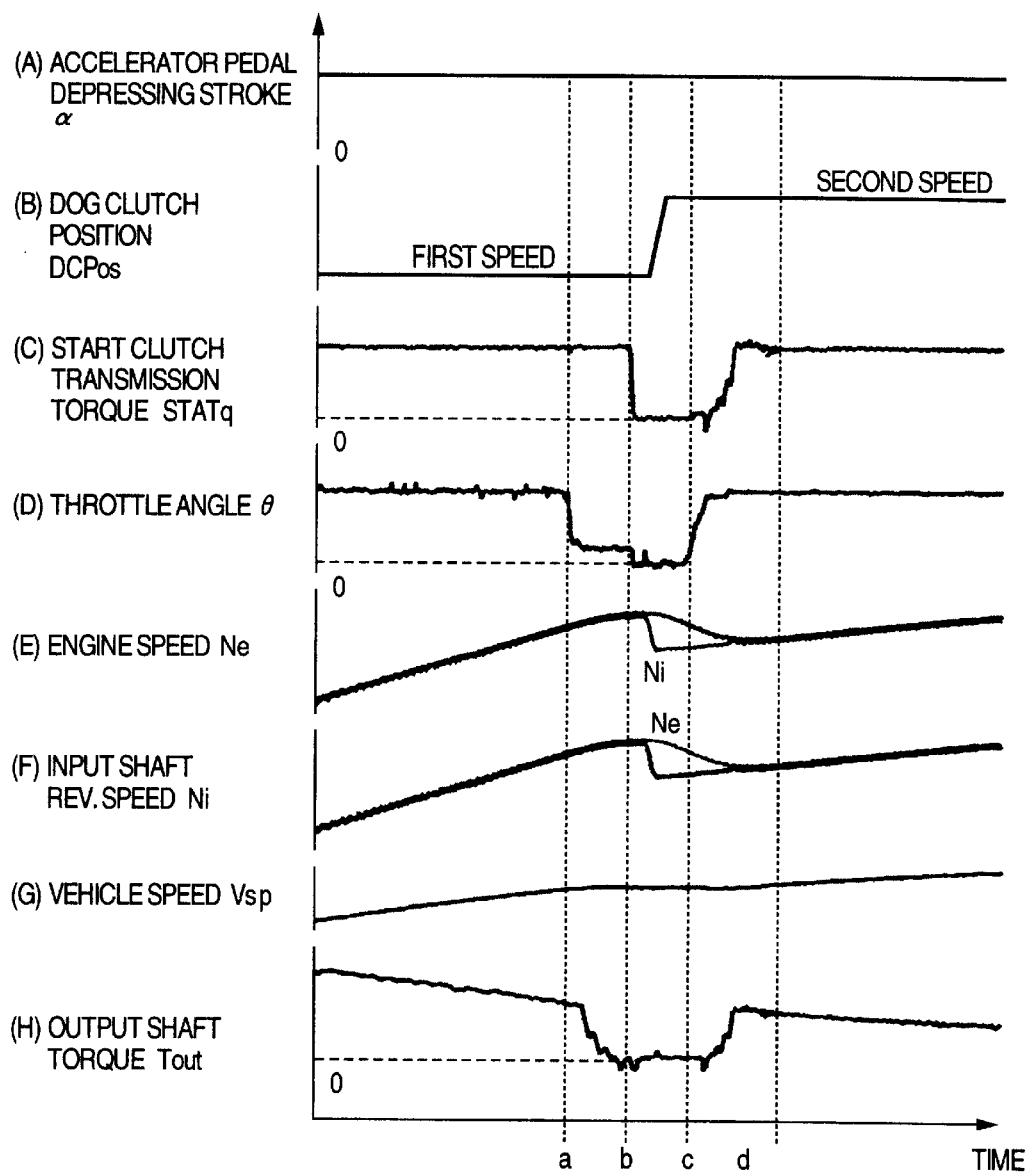
FIG. 7 is a flowchart of control of the throttle valve when engaging the start clutch.

At shifting gears, under the condition that the first driven gear 13 (first-speed driven gear) is coupled with the second clutch 18, when a request for gear shifting from first speed to second speed is given, at time a in FIG. 7, the start clutch (first clutch 5) is released (the start clutch transmission torque goes down to "0"). At this time, the throttle angle is reduced to a target throttle angle. As the start clutch is disengaged, the output shaft torque also falls. After this, in a period of b to c, the second clutch (dog clutch) 18 is disengaged from the first driven gear 13 (first-speed driven gear), and the second clutch (dog clutch) 18 is coupled with the second driven gear 14 (second-speed driven gear).

Hereafter, the engagement of the start clutch (first clutch 5) is controlled in the same way as has been described with reference to FIG. 3.

Figure 8:
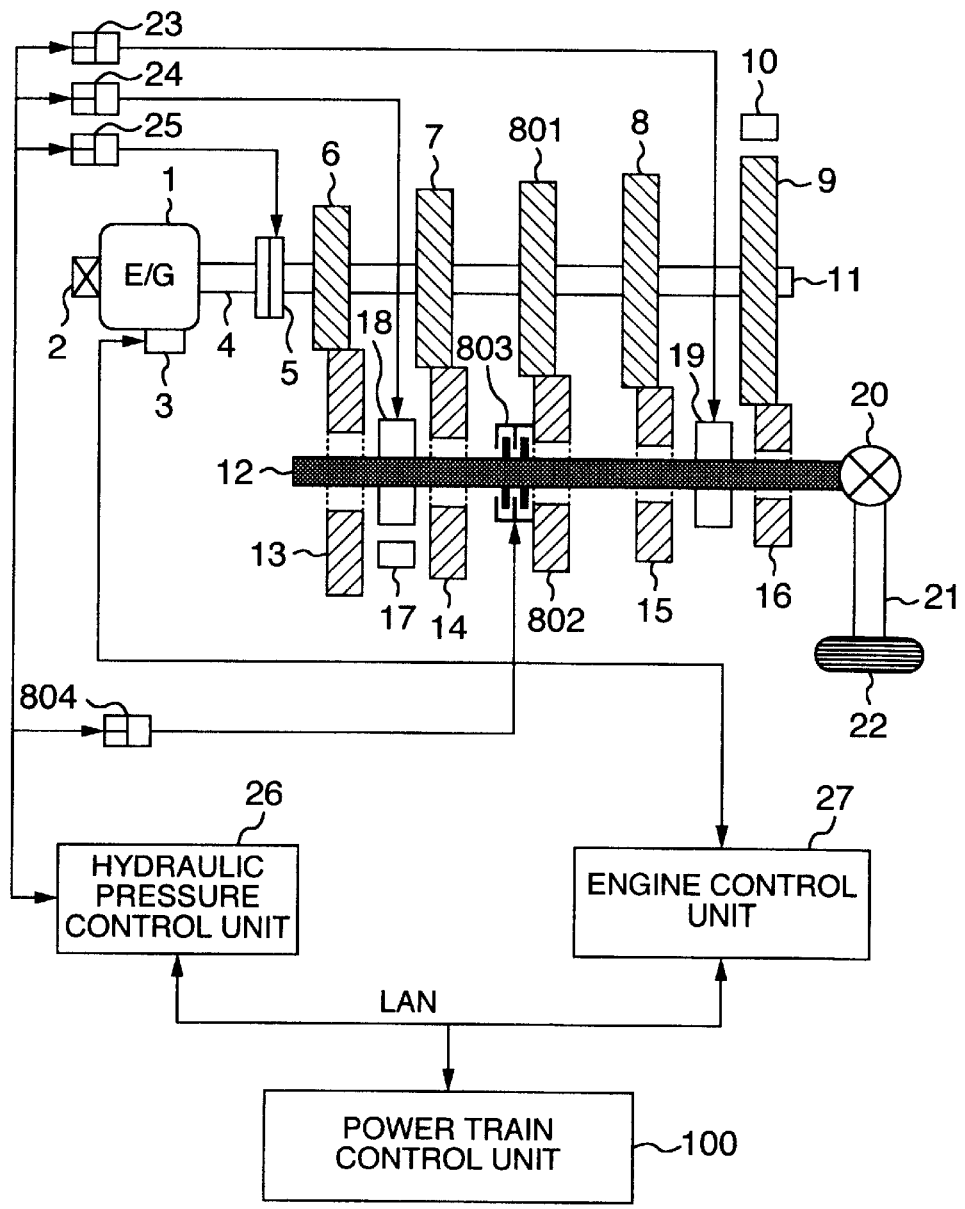
FIG. 8 is a general block diagram an automatic transmission according to a second embodiment of the present invention.

FIG. 8 shows a second embodiment of the control unit of an automotive vehicle according to the present invention. Differences of the second embodiment from the mode of embodiment shown in FIG. 1 are as follows. In the first embodiment in FIG. 1, the four-speed automatic MT is used and dog clutches are used for shifting the driven gears. On the other hand, in the second embodiment, a five-speed automatic MT is used and when shifting the driven gears, dog clutches are used between first speed and second speed and between fourth speed and fifth speed, and a friction clutch (e.g., a multiplate wet type) is used to engage and disengage the third speed driven gear. In other respects, there is not any difference from the first embodiment shown in FIG. 1.

More specifically, a fifth driven gear 802 is provided rotatably on the driving wheels output shaft 12 between the second driven gear 14 and the third driven gear 15, and a fifth drive gear 801 is fixed to the input shaft 11 and is in mesh with the fifth driven gear 802. The fifth driven gear 802 is connected with the transmission output shaft 12 through a fourth clutch 803 of friction type, and the fifth driven gear 802 is controlled by an actuator 804.

Figure 9:
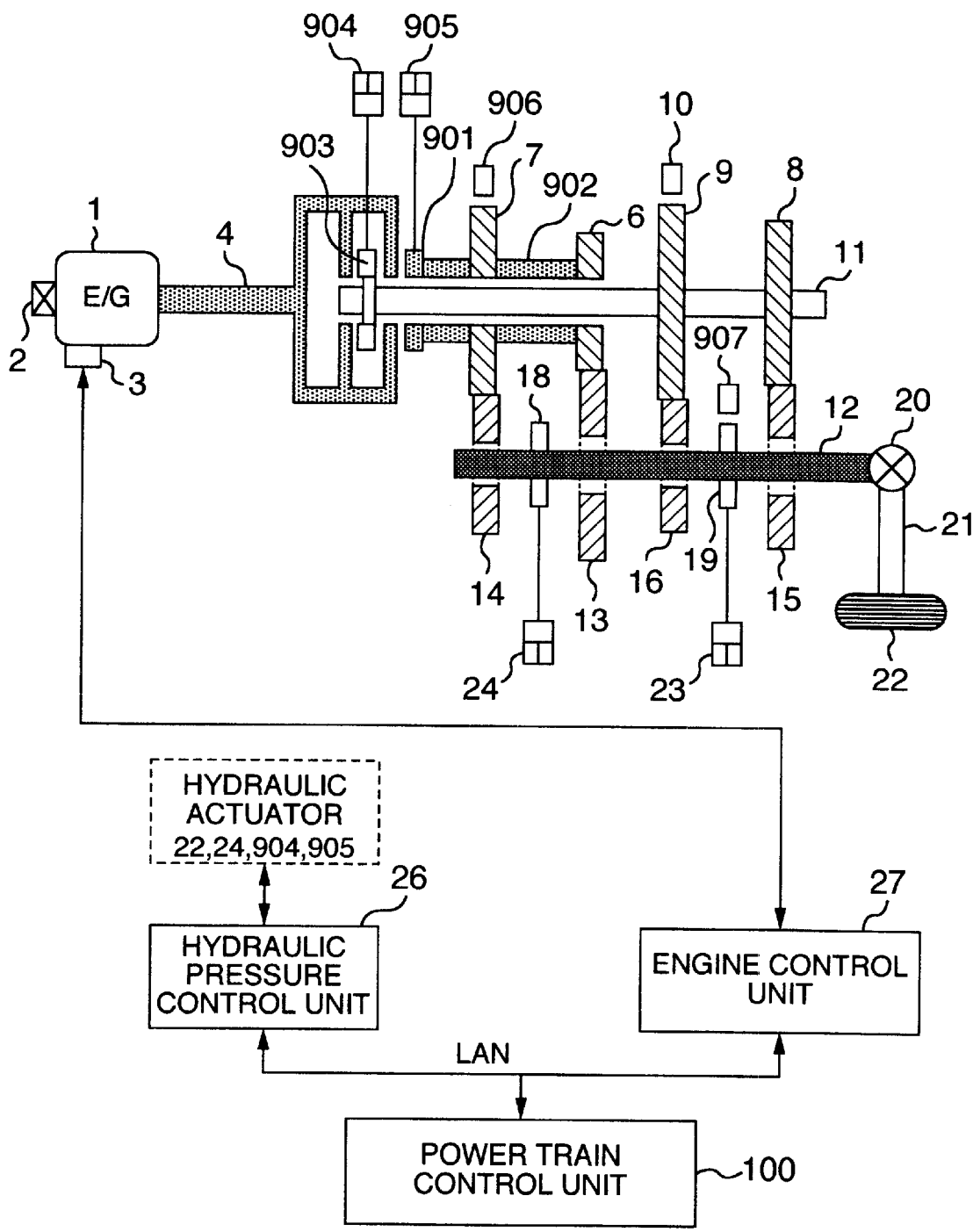
FIG. 9 is a general block diagram of an automatic transmission according to a third embodiment of the present invention.

FIG. 9 shows a third embodiment of the control unit for an automotive vehicle according to the present invention.

A difference of the third embodiment from the first embodiment shown in FIG. 1 is as follows. In the embodiment of FIG. 1, the engine torque is transmitted through the first clutch 5 to the input shaft 11. On the other hand, a twin clutch 603 is used as the first clutch for this purpose in the third embodiment. More specifically, reference numeral 901 denotes a second clutch of the dry single plate type, which is connected to a second input shaft 902. Reference numeral 903 denotes a first clutch of the dry single plate type, which is connected to the input shaft 11. The second input shaft 902 is in a hollow cylindrical structure; however, the input shaft 11, which passes through the hollow portion of the second input shaft 902, can move in the rotational direction relative to the input shaft 902. The second input shaft 902 has the first drive gear 6 and the second drive gear 7 fixed thereto, and the second input shaft 902 is rotatable relative to the input shaft 11. The second clutch 901 of the dry single plate type is controlled by an actuator 905 and the first clutch 903 of the dry single plate type is controlled by an actuator 904.

Figure 10:
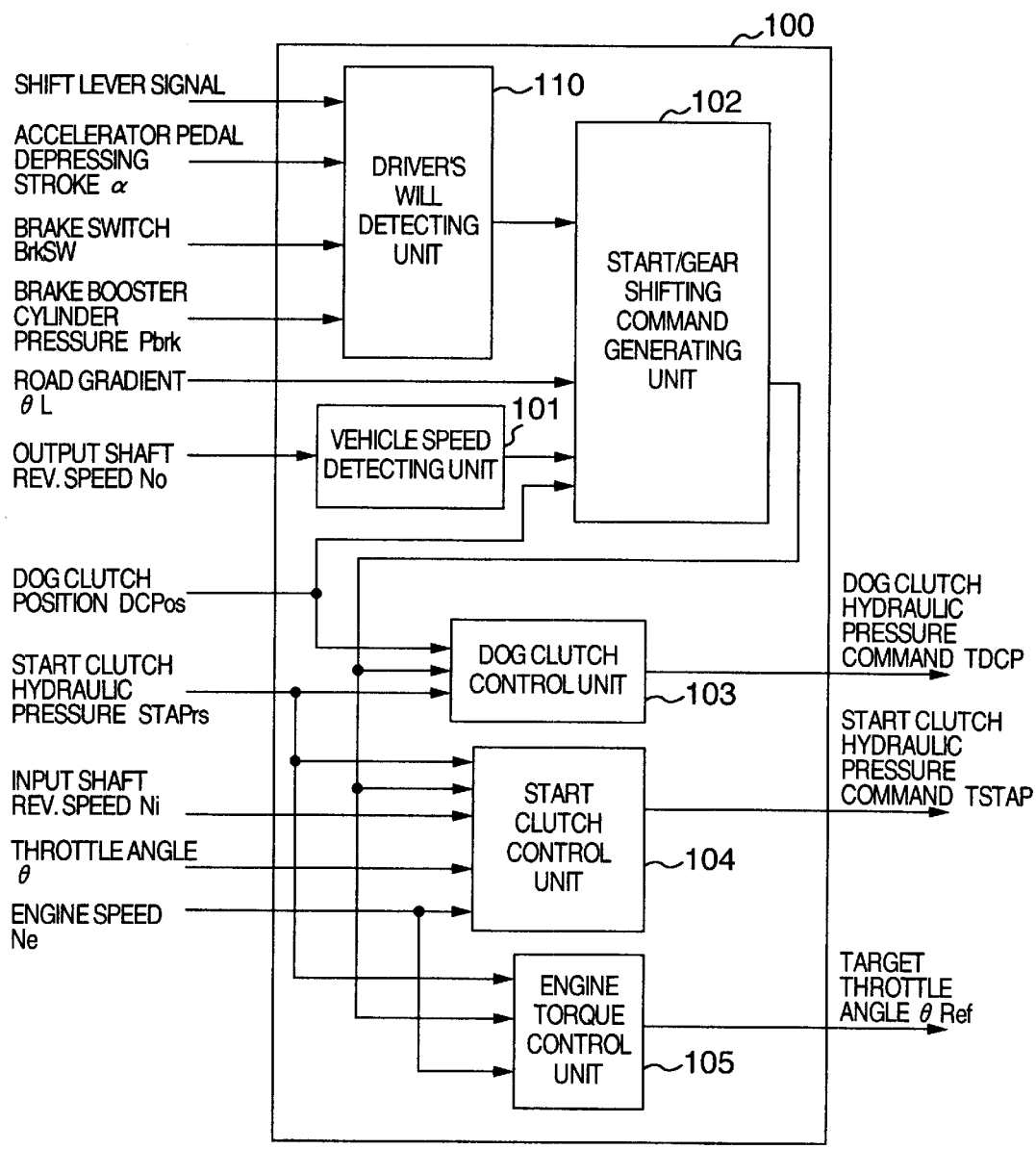
FIG. 10 is a block diagram of the power train control unit illustrated in FIG. 9.

FIG. 10 is a block diagram of the power train control unit 100 according to yet another embodiment of the present invention. The power train control unit 100 in FIG. 10 is the same in structure as the power train control unit 100 in FIG. 2. However, a difference of the power train control unit 100 in FIG. 10 from the power train control unit 100 in FIG. 2 is as follows. The power train control unit 100 in FIG. 2 inputs a start clutch position signal to the dog clutch control unit 103, the start clutch control unit 104 and the engine torque control unit 105. In contrast, the power train control unit 100 in FIG. 10 inputs a start clutch hydraulic pressure value to the dog clutch control unit 103, the start clutch control unit 104 and the engine torque control unit 105. In respect to control actions, the power train control unit in FIG. 2 does not differ much from the one 100 in FIG. 10.

Figure 11:
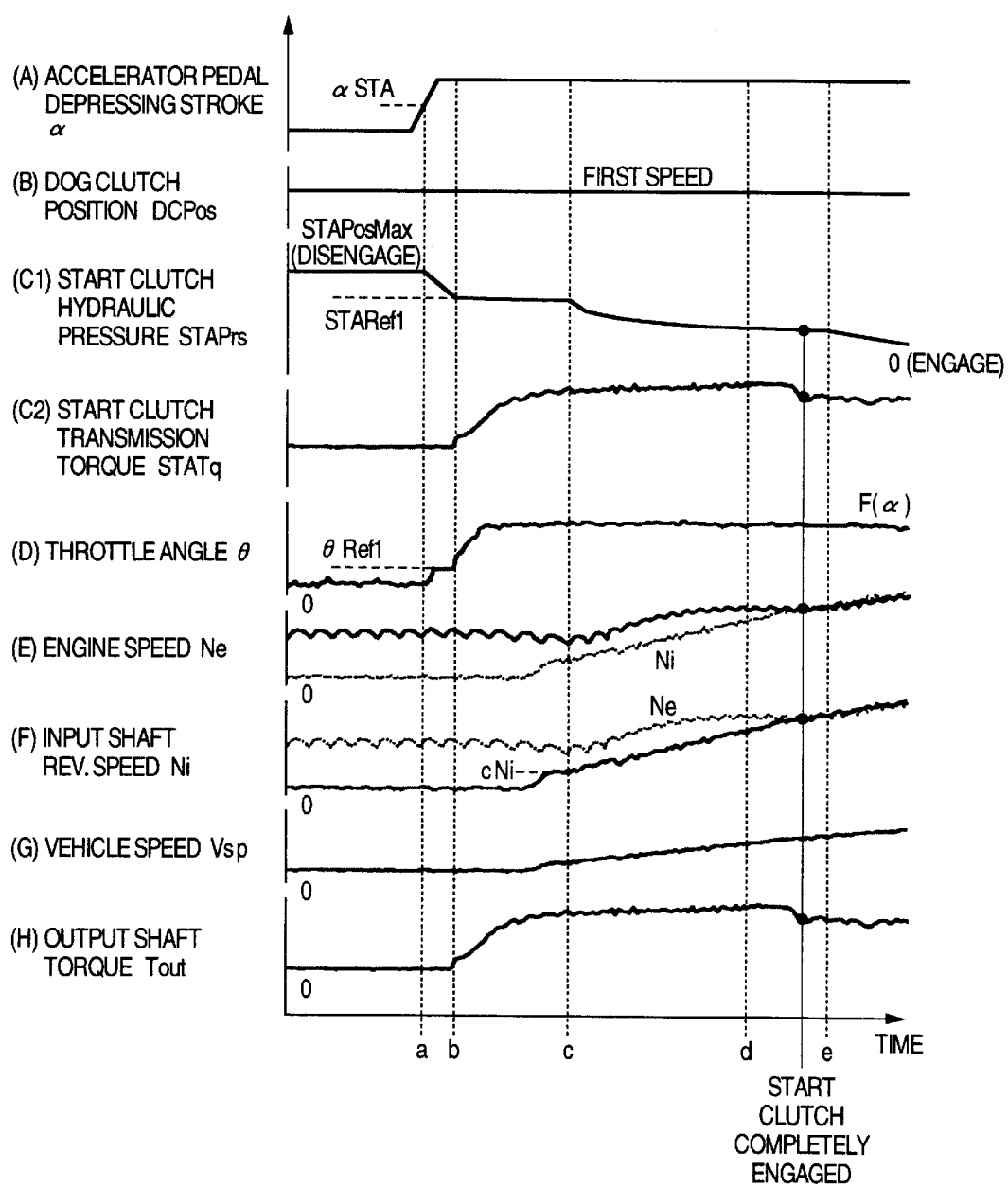
FIG. 11 is a time chart of control when engaging the start clutch for which a friction clutch is used.

FIG. 11 is a time chart of control when engaging the first clutch 5 for which the power train control unit 100 in FIG. 10 is used.

A difference between the time charts in FIGS. 11 and 3 is as follows. In the time chart in FIG. 3, the start clutch transmission torque (C2) is controlled by a start clutch position signal (C1), whereas in the time chart in FIG. 11, the start clutch transmission torque (C2) is controlled by a start clutch hydraulic pressure signal (C1). In other words, as the engagement of the start clutch (first clutch 5) progresses, the start clutch hydraulic pressure (STAPrs) is decreased. Consequently, as the start clutch hydraulic pressure value (STAPrs) is decreased, the start clutch transmission torque (STATq) rises.

Creep torque control will be described with reference to FIGS. 12 to 29.

Figure 12:
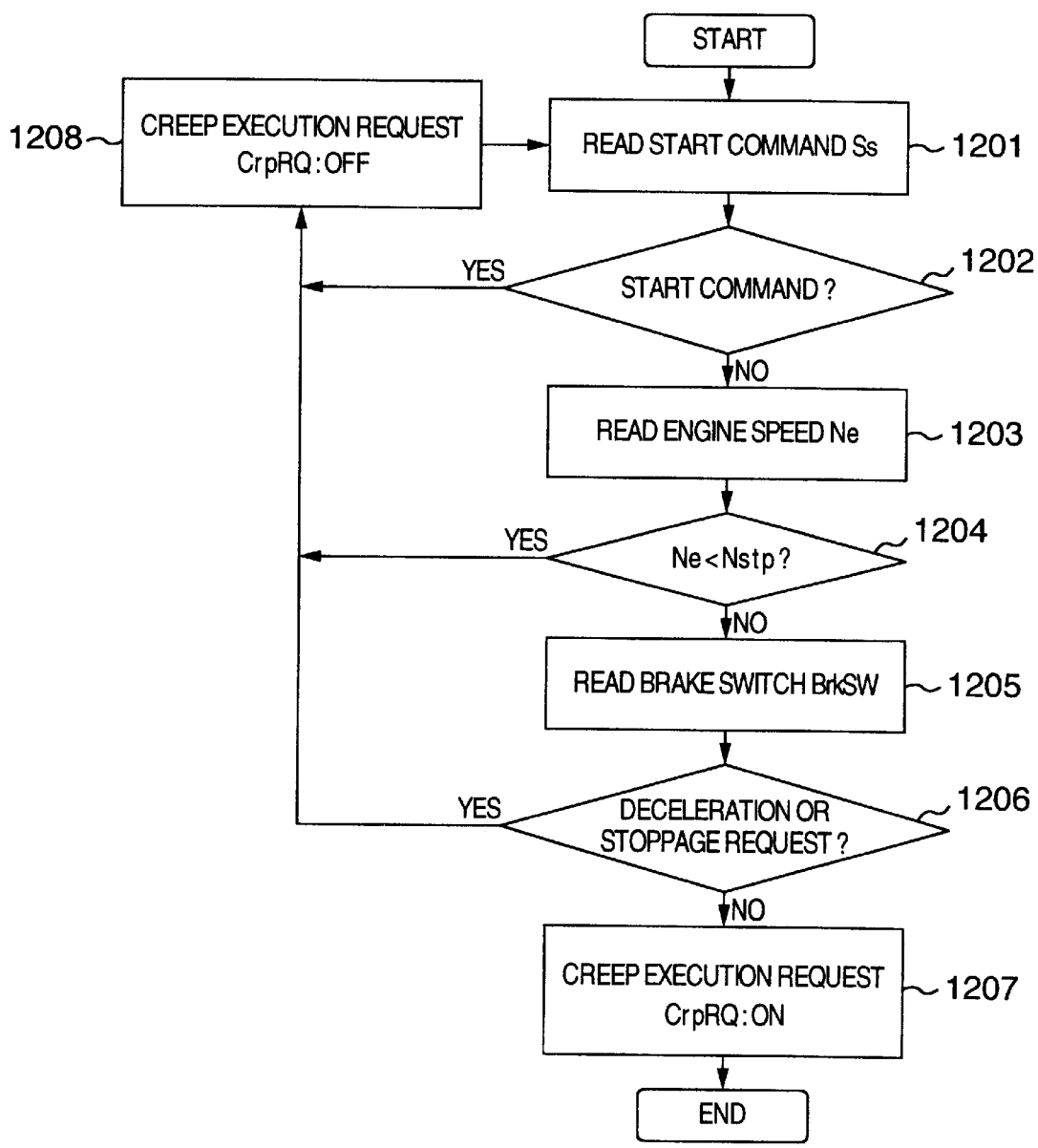
FIG. 12 is a flowchart of making a decision about a request for performing control of creep torque.
Figure 13:
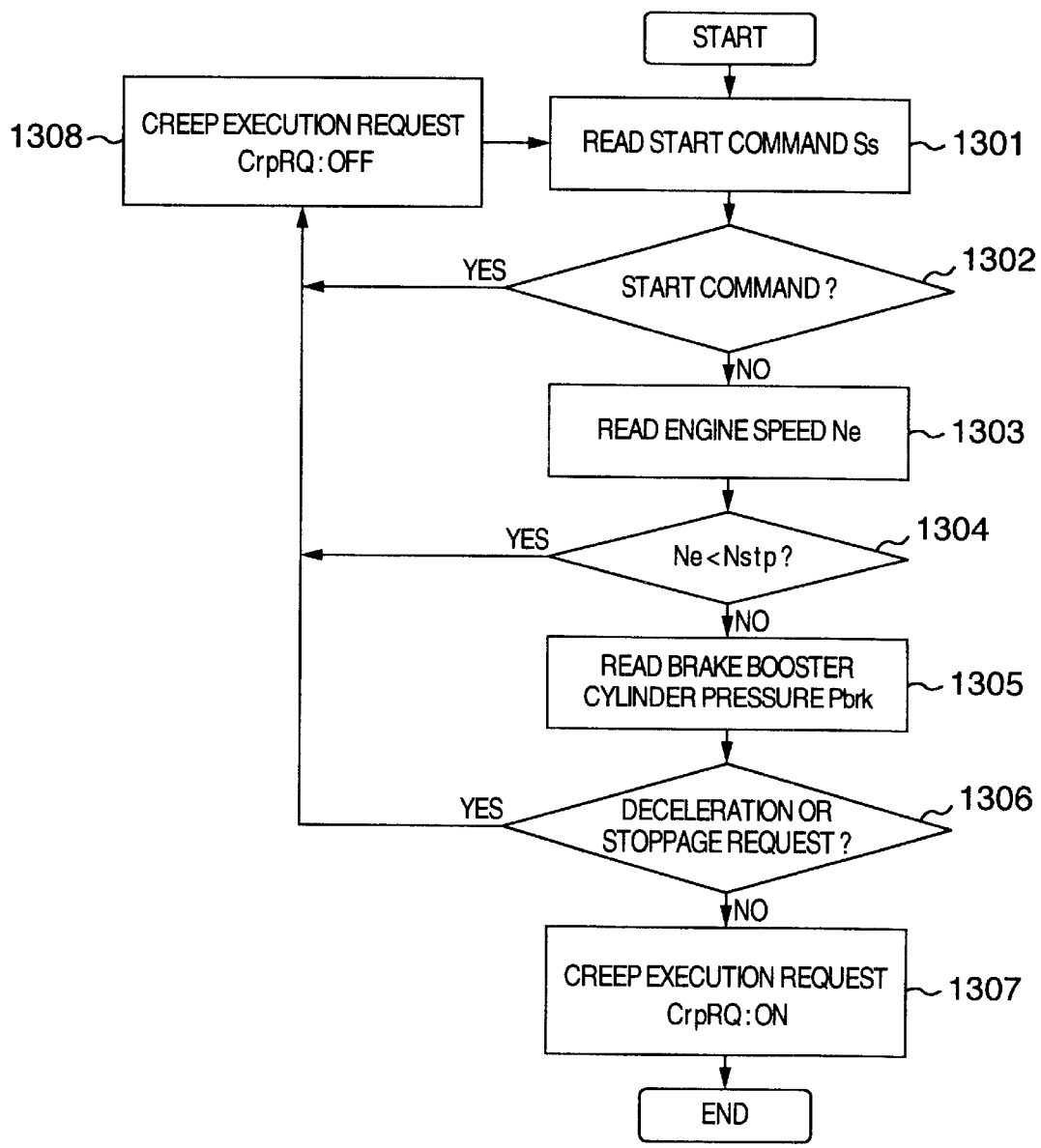
FIG. 13 is a flowchart of making a decision about a request for performing control of creep torque.
Figure 14:
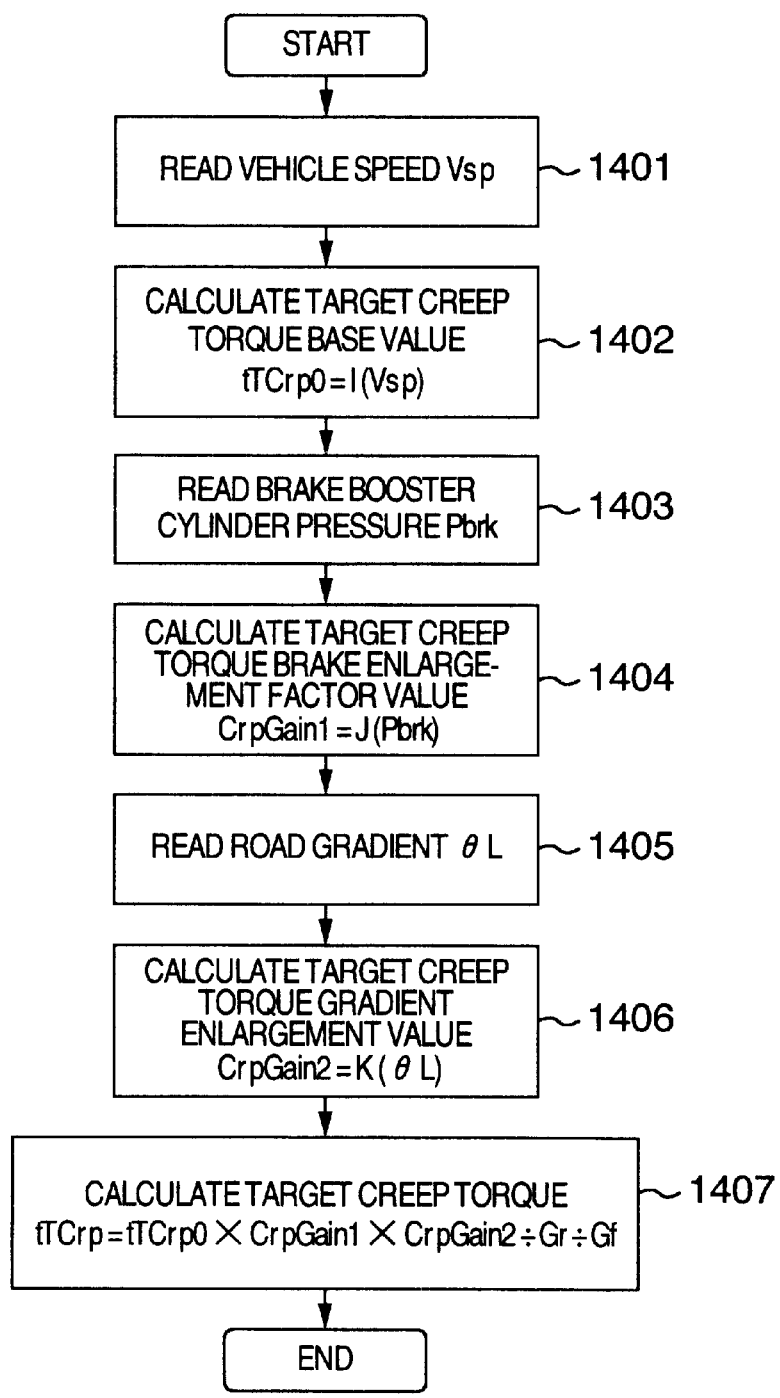
FIG. 14 is a flowchart of calculation of a target creep torque value.
Figure 15:
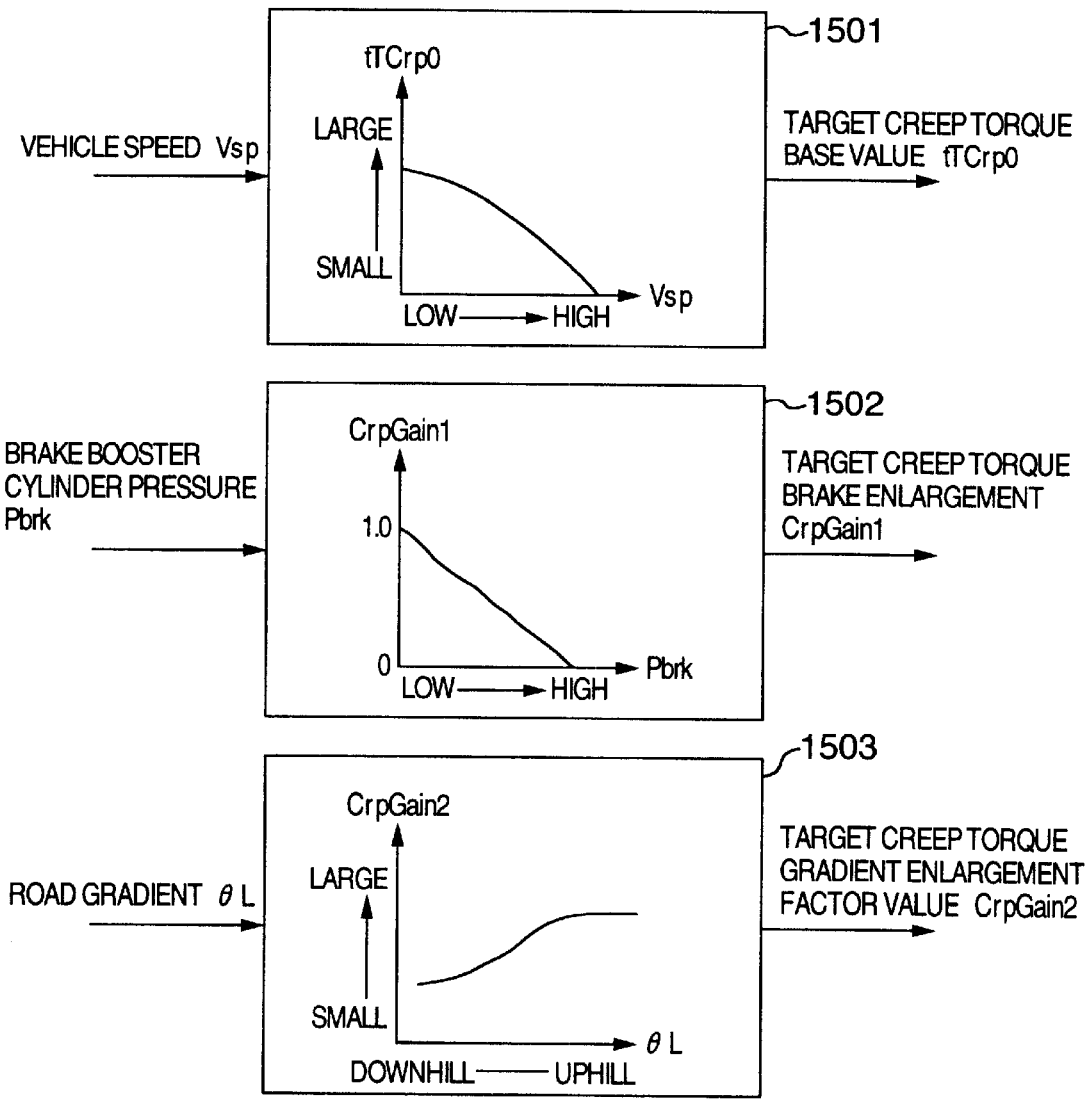
FIG. 15 shows maps for obtaining target creep torque values.
Figure 16:
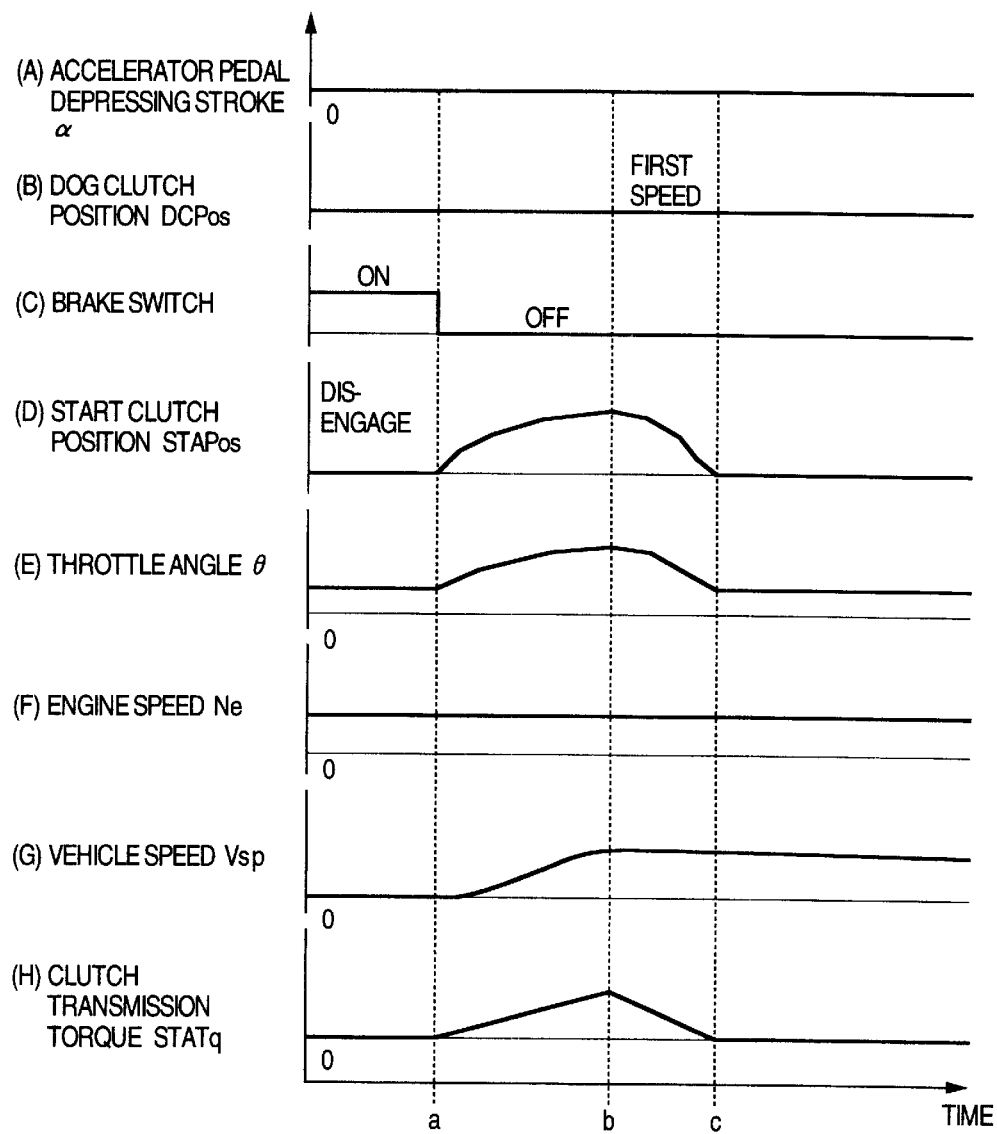
FIG. 16 is a time chart of creep torque control when the start-clutch transmission torque is controlled by control of the position of the start clutch.
Figure 17:
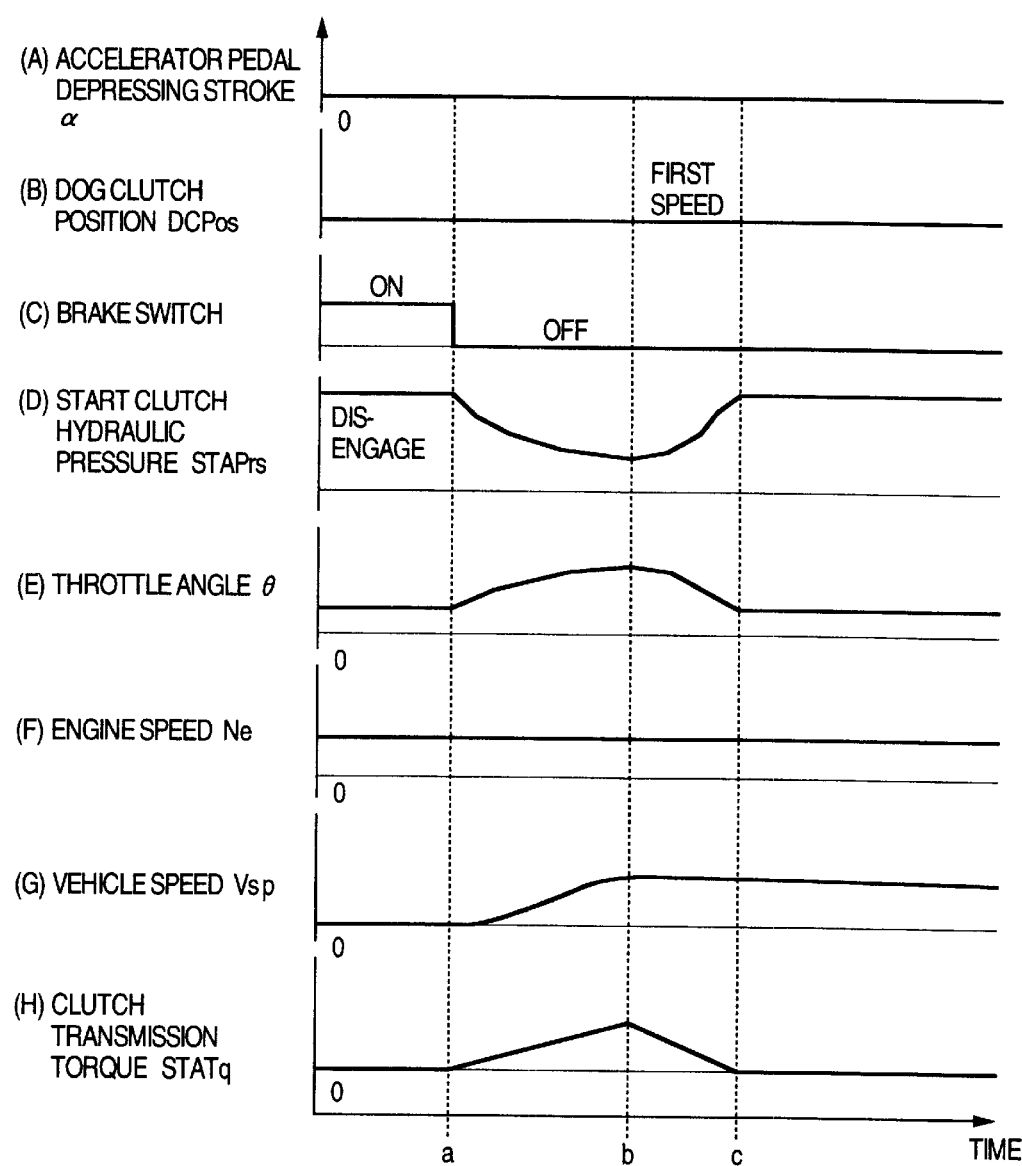
FIG. 17 is a time chart of creep torque control when the start-clutch transmission torque is controlled by controlling the hydraulic pressure of the start clutch.
Figure 18:
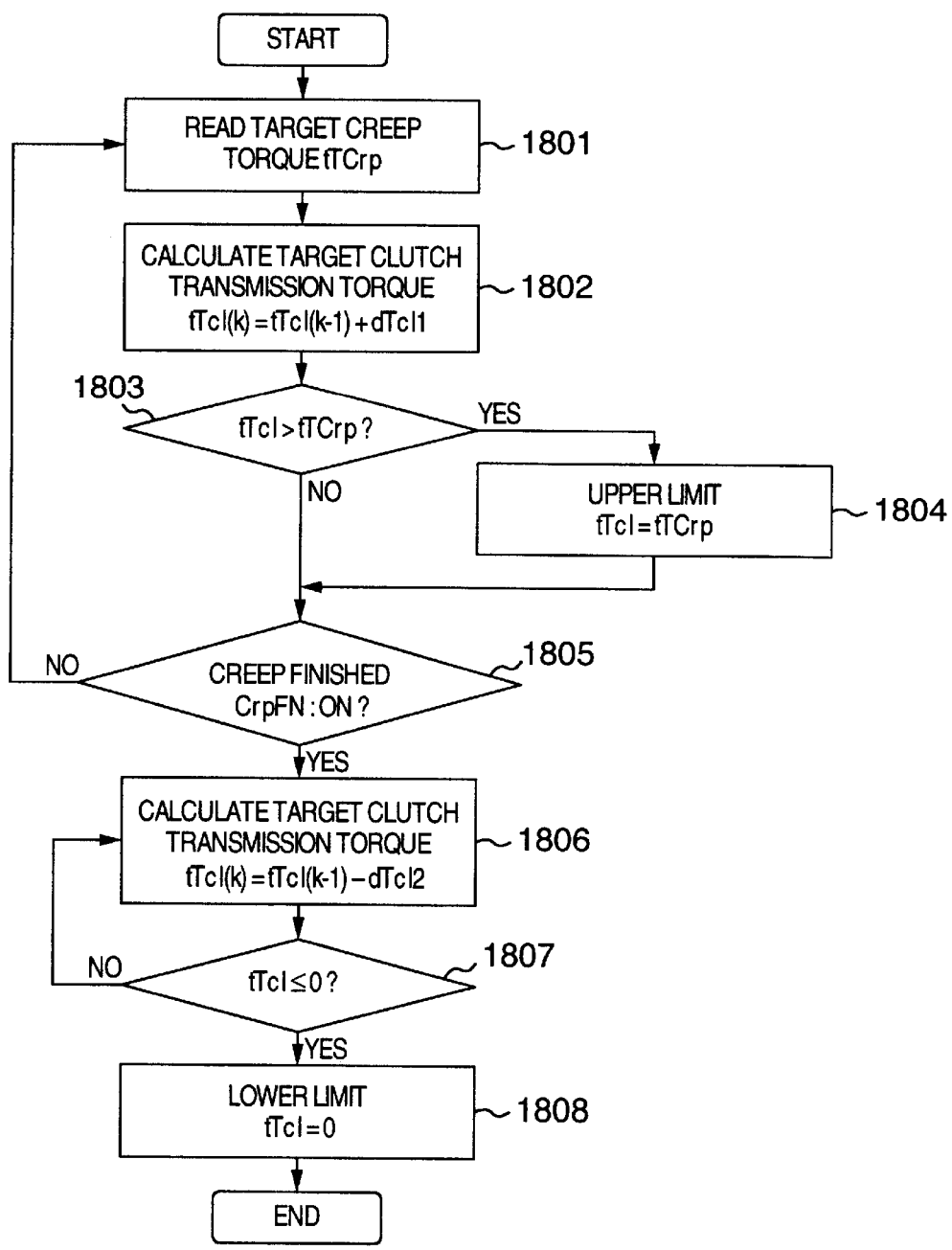
FIG. 18 is a flowchart of calculation of a target start-clutch transmission torque.
Figure 19:
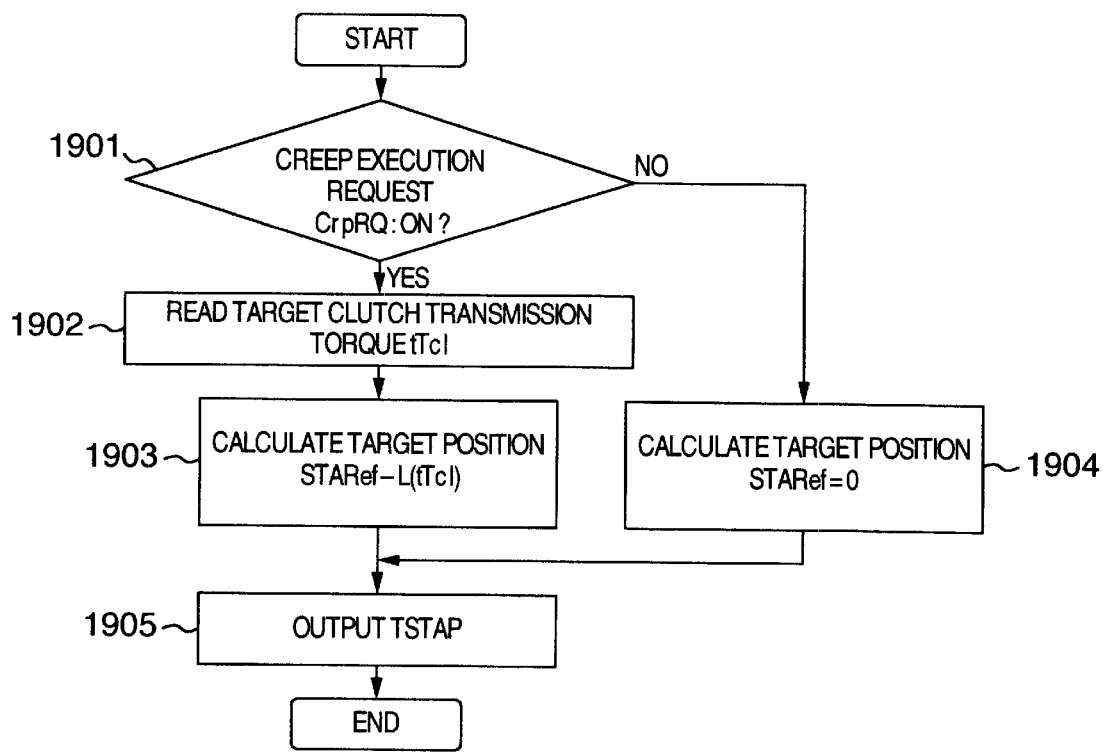
FIG. 19 is a flowchart of a calculation process of start clutch position carried out by a creep execution request when the start-clutch transmission torque is controlled by controlling the position of the start clutch.
Figure 20:
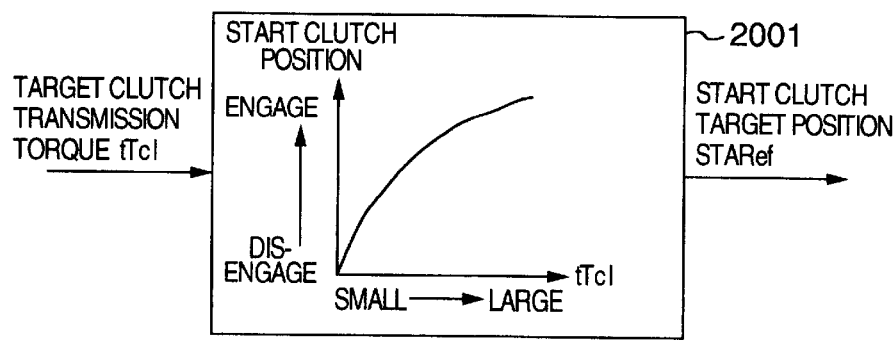
FIG. 20 is a control map for obtaining a target position of the start clutch from a target start-clutch transmission torque.
Figure 21:
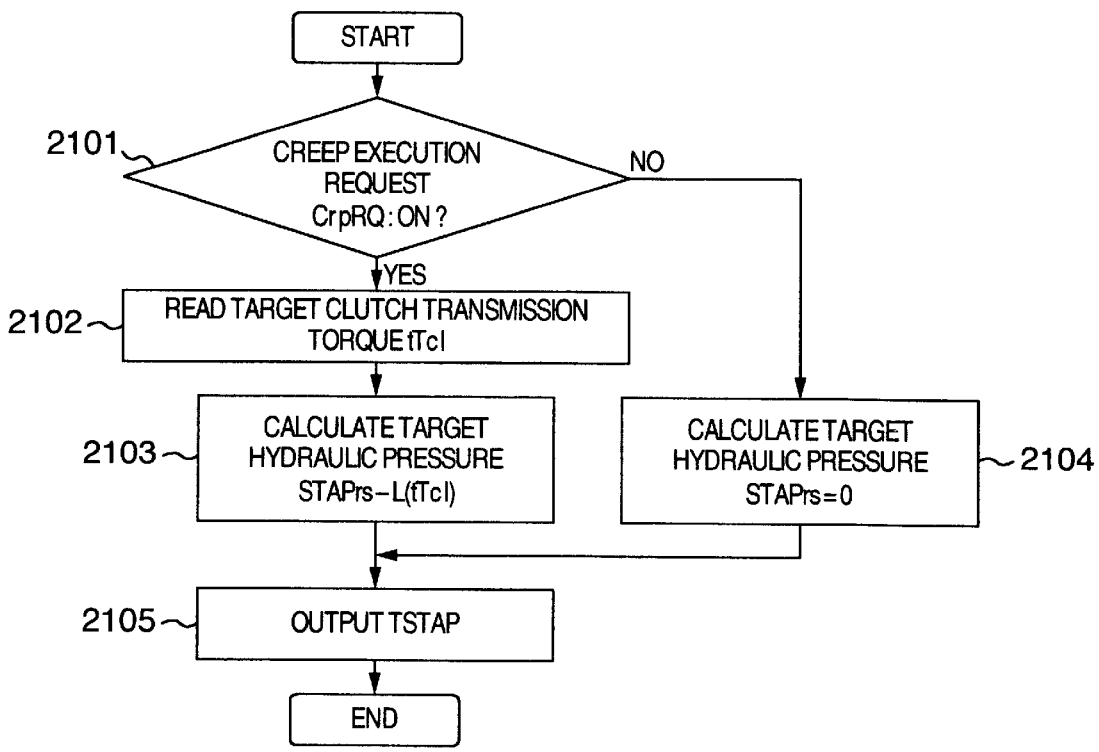
FIG. 21 is a flowchart of calculation of a target hydraulic pressure value of the start clutch from a target start-clutch transmission torque.
Figure 22:
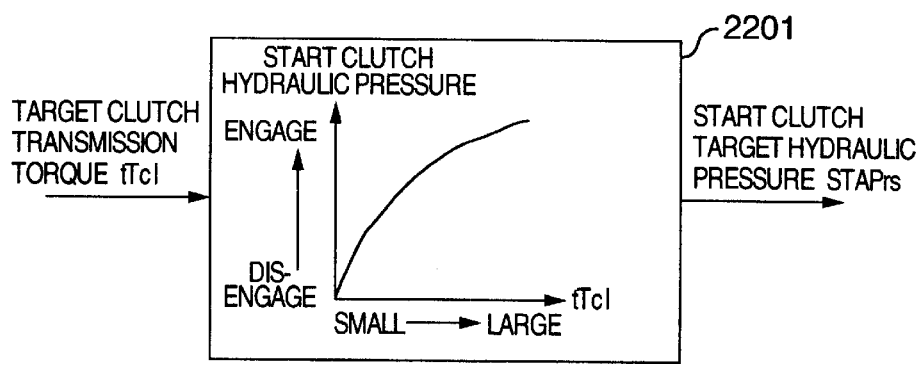
FIG. 22 is a control map for obtaining a target hydraulic pressure value of the start clutch from a target start-clutch transmission torque.
Figure 23:
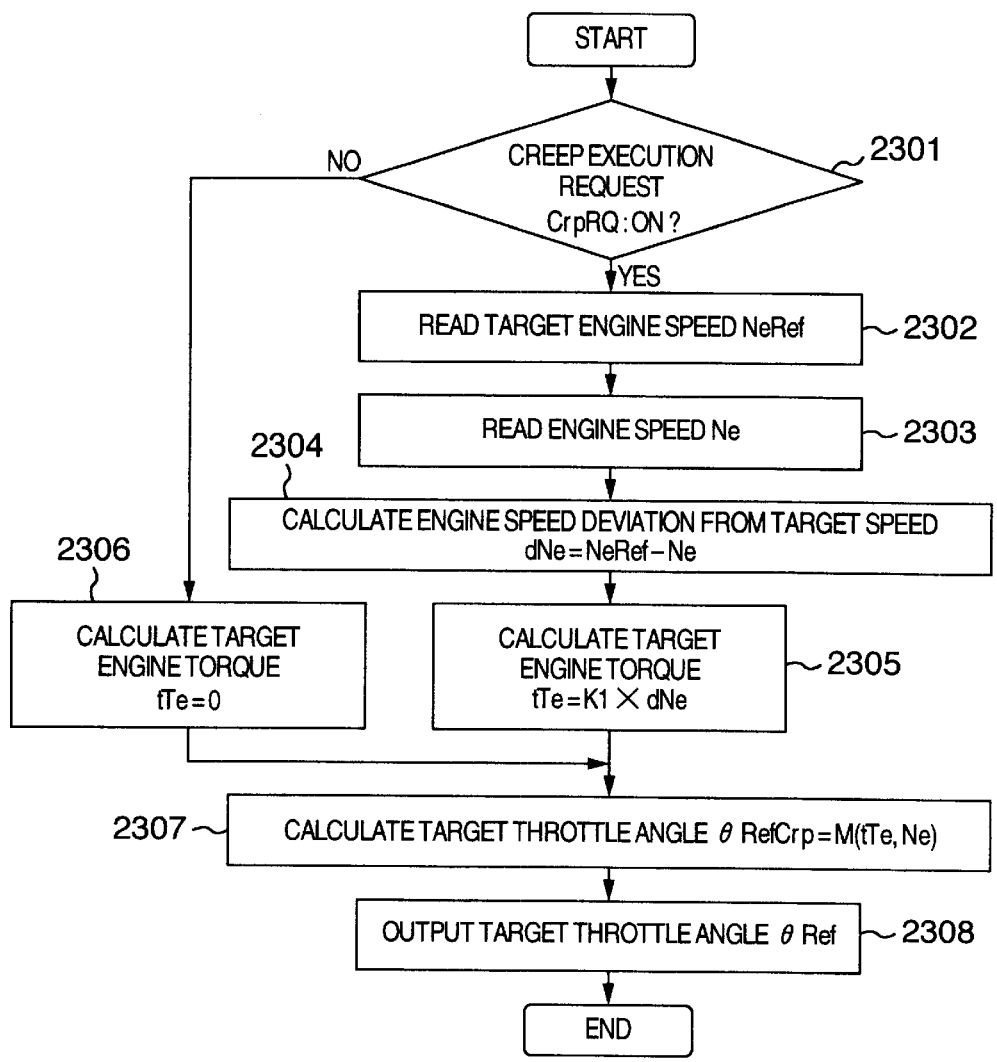
FIG. 23 is a control map for obtaining a throttle angle (opening) when a creep execution request is made.
Figure 24:
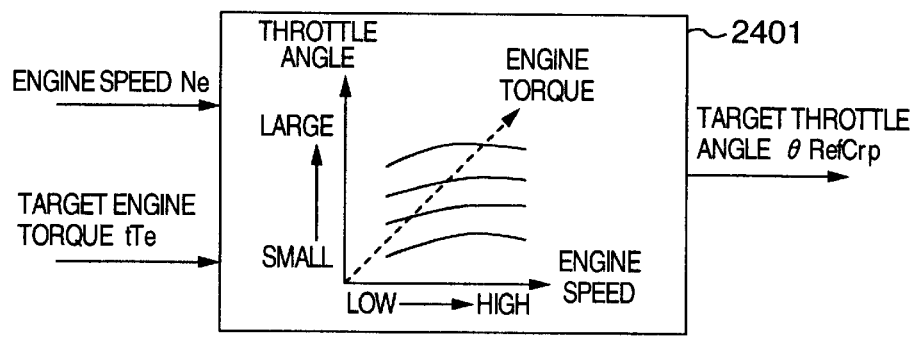
FIG. 24 is a control map for obtaining a target throttle angle from the engine speed and a target engine torque.
Figure 25:
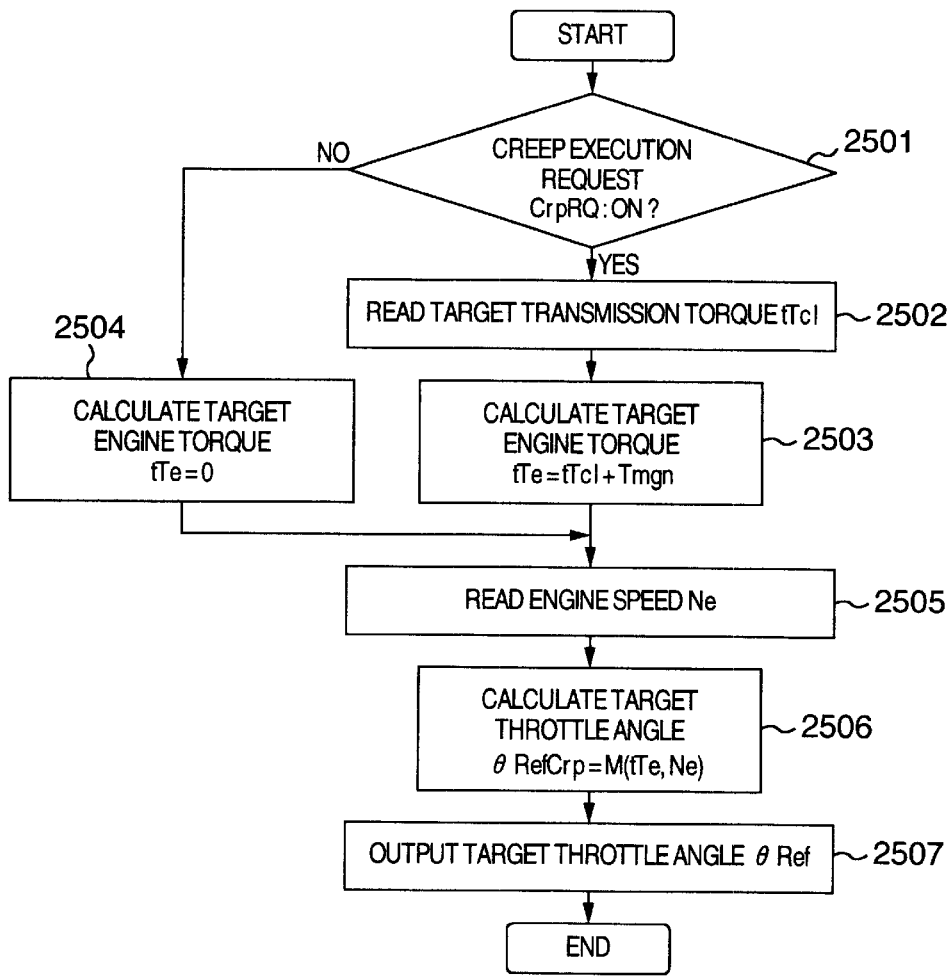
FIG. 25 is another control flowchart for obtaining a throttle angle when a creep execution request is made.
Figure 26:
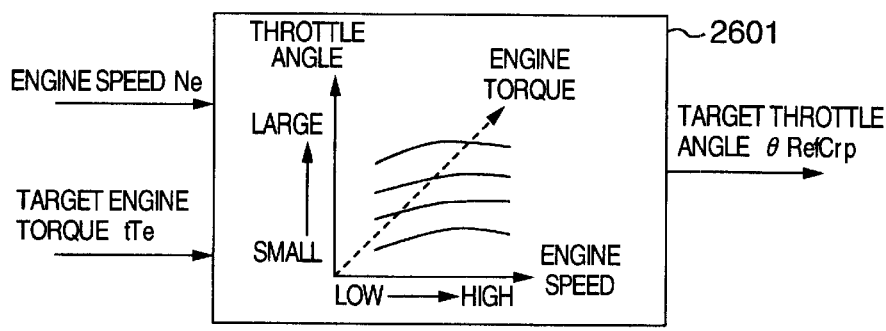
FIG. 26 is a control map for obtaining a target throttle angle from the engine speed and a target engine torque.
Figure 27:
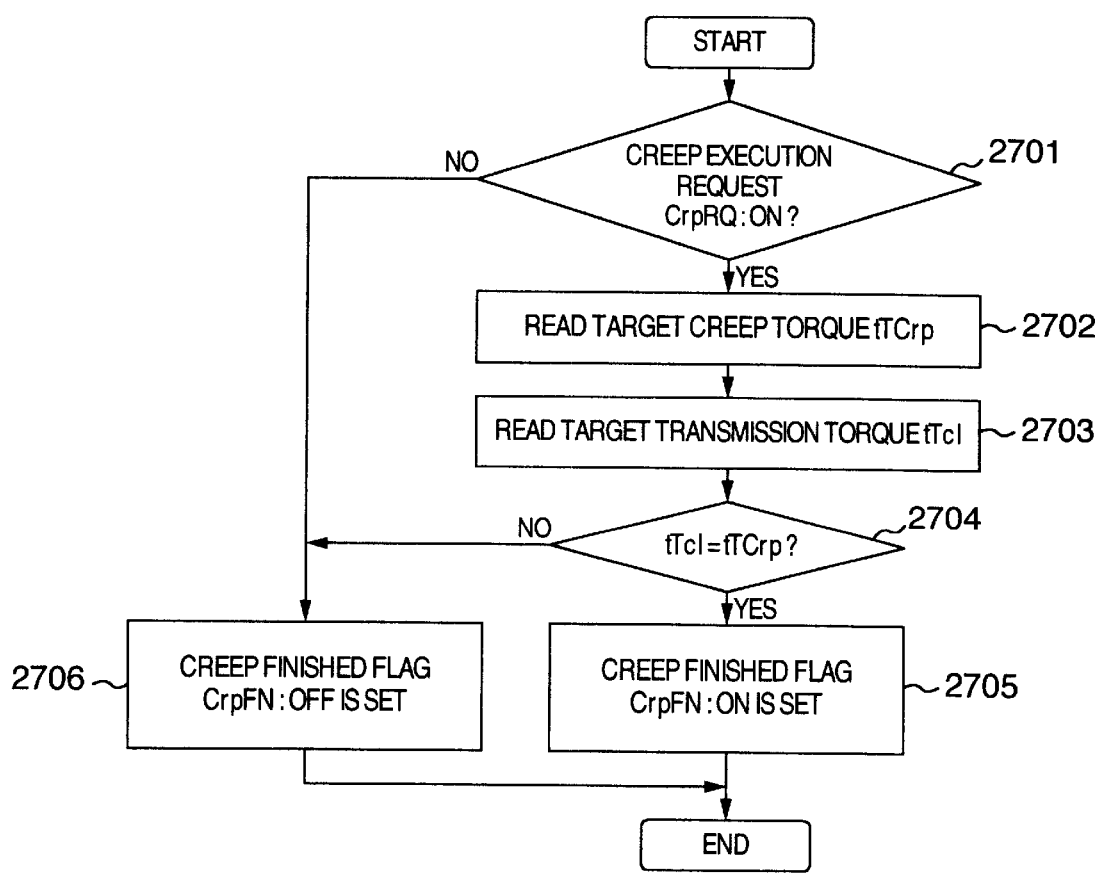
FIG. 27 is a process flowchart until the end of creep execution when a creep execution request is made.
Figure 28:
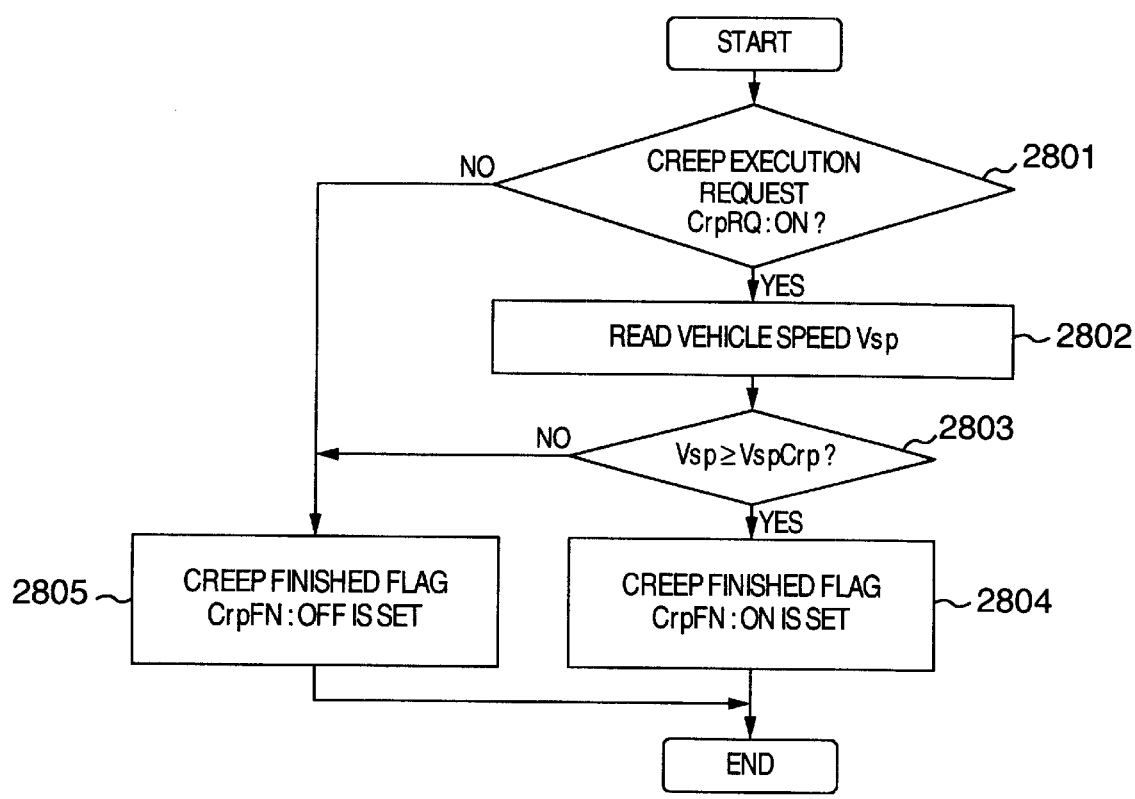
FIG. 28 is another process flowchart until the end of creep execution when a creep execution request is made.
Figure 29:
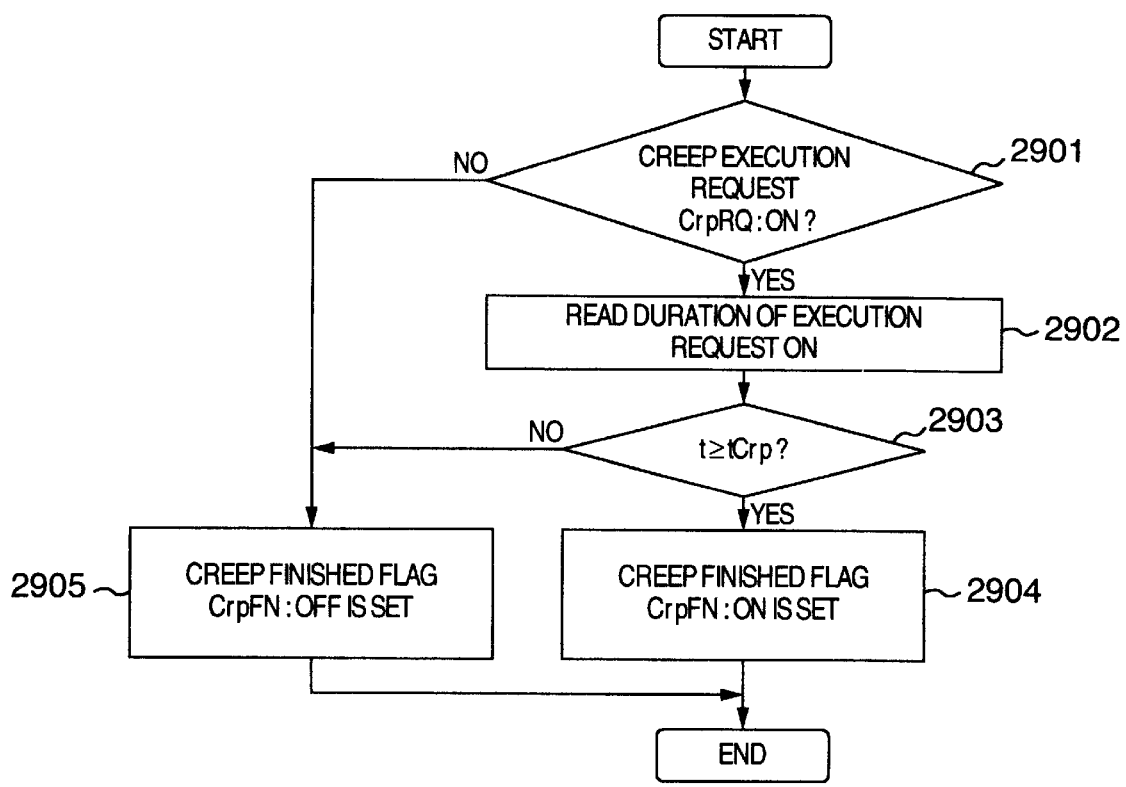
FIG. 29 is yet another process flowchart until the end of creep execution when a creep execution request is made.

FIG. 12 is a flowchart of making a decision about a request for performing creep torque control by using a brake switch; FIG. 13 is a flowchart of making a decision about a request for performing creep torque control by using a master cylinder pressure of a power brake; FIG. 14 is a flowchart of calculation of a target creep torque value; FIG. 15 is maps for obtaining target creep torque values; FIG. 16 is a time chart of creep torque control when the start-clutch transmission torque is controlled by controlling the position of the start clutch; FIG. 17 is a time chart of creep torque control when the start-clutch transmission torque is controlled by controlling the hydraulic pressure of the start clutch; FIG. 18 is a flowchart of calculation of a target start-clutch transmission torque; FIG. 19 is a flowchart of a calculation process of start clutch position carried out by a creep execution request when the start-clutch transmission torque is controlled by controlling the position of the start clutch; FIG. 20 is a control map for obtaining a target position of the start clutch from a target start-clutch transmission torque; FIG. 21 is a flowchart of calculation of a target hydraulic pressure value of the start clutch from a target start-clutch transmission torque; FIG. 22 is a control map for obtaining a target hydraulic pressure value of the start clutch from a target start-clutch transmission torque; FIG. 23 is a control flowchart for obtaining a throttle angle when a creep execution request is made; FIG. 24 is a control map for obtaining a target throttle angle from the engine speed and a target engine torque; FIG. 25 is another control flowchart for obtaining a throttle angle when a creep execution request is made; FIG. 26 is a control map for obtaining a target throttle angle from the engine speed and a target engine torque; FIG. 27 is a process flowchart until the end of creep execution when a creep execution request is made; FIG. 28 is another process flowchart until the end of creep execution when a creep execution request is made; and FIG. 29 is yet another process flowchart until the end of creep execution when a creep execution request is made.

FIG. 12 is a flowchart of making a decision about a request for performing control of creep torque.

In FIG. 12, in a step 1201, if the shift lever is in a drive range, such as D or R and a start command is output from the start/gear shifting command generating unit 102, in the next step 1202, a decision is made whether or not a command from the start/gear shifting command generating unit 102 is a start command (indicating that the accelerator pedal is depressed). If a decision is made that the command that has been output is a start command, in a step 1210, then the request for creep execution is turned off and control at starting the vehicle is performed.

In a step 1202, if a decision is made that the command output from the start/gear shifting command generating unit 102 is not a start command (implying that the accelerator pedal is depressed), in a step 1203, the engine speed detected by the engine speed sensor 2 is read. In a step 1204, a decision is made whether or not the engine speed Ne that was read is smaller than a setting speed Nstp. If a decision is made that the engine speed Ne that was read is smaller than the setting speed Nstp, then in a step 1208, the request for creep execution is turned off. If a decision is made in the step 1204 that the engine speed Ne that was read is greater than the setting speed Nstp, in a step 1205, the state of a brake switch BrkSW is read. After the state of the BrkSW is read in the step 1205, a decision is made in a step 106 whether or not a request for deceleration and stoppage has been detected by the driver's will detecting unit 110. If a decision is made that there has not been a request for deceleration and stoppage, then in a step 1207, a creep execution request is turned on. However, if a decision is made in the step 1206 that a request for deceleration and stoppage has been detected by the driver's will detection unit 110, in a step 1208, the request for creep execution is turned off.

FIG. 13 is a flowchart of creep torque control using a master cylinder pressure of the brake booster.

The steps 1301 to 1304 of the flowchart of creep torque control using a master cylinder pressure of the brake booster in FIG. 13 are the same as the steps 1201 to 1204 of the flowchart of creep torque control using the brake switch in FIG. 12. Moreover, the steps 1307 and 1308 of the flowchart of creep torque control using a master cylinder pressure of the brake booster in FIG. 13 are the same as the steps 1207 and 1208 of the flowchart of creep torque control using the brake switch in FIG. 12.

A difference of the flowchart of creep torque control using a master cylinder pressure of the brake booster in FIG. 13 from the flowchart of creep torque control using the brake switch in FIG. 12 is as follows. In the flowchart of creep torque control using the brake switch in FIG. 12, after a decision is made in the step 1204 that the engine speed Ne that was read is greater than the setting speed Nstp, in the step 1205, the state of the brake switch BrkSW is read, and in the step 1206, a decision is made whether or not a request for deceleration and stoppage has been detected by the driver's will detection unit 110. On the other hand, in the flowchart of creep torque control using a master cylinder pressure of the brake booster in FIG. 13, after a decision is made in the step 1304 that the engine speed Ne that was read is greater than the setting speed Nstp, in the step 1305, the master cylinder pressure of the brake booster is read, and in the step 1306, a decision is made whether or not a request for deceleration and stoppage has been detected by the driver's will detection unit 110.

FIG. 14 is a flowchart of calculation of a target creep torque value.

Referring to FIG. 14, in a step 1401, the vehicle speed Vsp is read, and in a step 1402, a target creep torque base value is calculated from the read-in vehicle speed Vsp by using characteristic maps shown in FIG. 15. In a step 1403, the brake booster cylinder pressure Pbrk is read, and in a step 1404, a target creep torque brake enlargement factor value is calculated from the read brake booster cylinder pressure Pbrk by using characteristic maps shown in FIG. 15. Further, in a step 1405, a road gradient θL is read, and in the next step 1406, a target creep torque gradient enlargement factor is calculated from the read road gradient θL by using the characteristic maps in FIG. 15. In a step 1407, a target creep torque value is calculated from the target creep torque base value, the target creep torque brake enlargement factor value, and the target creep torque gradient enlargement factor value.

To detect the road gradient, a method is available for estimating a road gradient on the basis of a balance equation shown below.

$$T\theta = TD - (TRL + T\alpha)$$

where

TD: drive torque (Obtainable from engine characteristics)

TRL: level ground running resistance torque (Obtainable from vehicle speed)

Tα: acceleration resistance torque (Obtainable from vehicle acceleration)

Tθ: gradient resistance torque (sin unknown)

It is also possible to use a method using road gradient values in road information incorporated in a navigation system (not shown).

FIG. 16 is a time chart for creep torque control when controlling the start clutch transmission torque through control of the start clutch position.

Referring to FIG. 16, under the condition that the depressing stroke α of the accelerator pedal is "0" and the third clutch (dog clutch) 19 is connected to the fourth driven gear 16, if the brake switch is in the ON state, the start clutch (first clutch 5) is on the OFF position. At this time, the throttle angle θ is held at a fixed value, the engine speed Ne is held at a fixed value, the vehicle speed Vsp is "0" because the brake pedal is depressed, and the clutch transmission torque STATq is "0" because the start clutch 5 is disengaged.

When, at time a, the brake switch is switched from ON to OFF, the start clutch 5 is switched from the OFF state and starts to enter a slipping engagement phase and goes to be gradually engaged. As the start clutch 5 starts to enter the slipping engagement state, the clutch transmission torque STATq rises at a specified gradient. This rise of the clutch transmission torque STATq is additional load on the engine, which would lead to a decrease in the engine speed Ne. To maintain the engine speed Ne at a constant value, however, the throttle angle θ increases in proportion to a rise in the engaging power corresponding to the position of the start clutch 5. Consequently, the engine speed Ne is held at a constant speed. By this slipping engagement of the start clutch 5, the vehicle starts to run and the vehicle speed Vsp gradually increases. When the vehicle speed Vsp reaches a setting value (at time b), the engagement of the start clutch 5 is gradually released, and the start clutch 5 is disengaged completely at time c. In a period from b to c, the throttle angle is controlled so as to reach a specified value keeping pace with the release of the engagement of the start clutch 5. The clutch transmission torque STATq is controlled so as to come to "0" as the release of the engagement of the start clutch 5 comes to an end. Thus, the vehicle runs by inertia and comes to a standstill in the course of time.

FIG. 17 is a time chart of creep torque control when the start clutch transmission torque is controlled by controlling the hydraulic pressure of the start clutch. A difference between this mode of embodiment and the mode of embodiment shown in FIG. 6 is as follows. In the embodiment in FIG. 6, when the brake switch is switched from ON to OFF, the position of the start clutch (first clutch 5) is controlled to switch the start clutch 5 from the OFF state to move into the engaged state. In contrast, in the embodiment in FIG. 7, when the brake switch is switched from ON to OFF, the hydraulic pressure of the start clutch 5 is controlled to bring the start clutch 5 into the engaged state. In other respects of control, this embodiment is the same as in the embodiment shown in FIG. 6.

FIG. 18 is a flowchart of calculating a target clutch transmission torque from a target creep torque.

Referring to FIG. 18, in a step 1801, a target creep torque obtained in the flowchart in FIG. 14 is read, and in a step 1802, target clutch transmission torque is calculated from the read target creep torque. In a step 1803, a decision is made whether or not the calculated target clutch transmission torque is larger than a setting clutch transmission torque, and if a decision is made that the target clutch transmission torque calculated in the step 1803 is larger than the setting clutch transmission torque, and in a step 1804, a upper limit value is set for the setting clutch transmission torque value, and the process proceeds to a step 1805, a decision is made whether or not creep has been finished. If a decision is made in the step 1803 that the calculated target clutch transmission torque is smaller than the setting clutch transmission torque, then in the step 1805, a decision is made whether or not the creep has been finished.

If a decision is made in the step 1805 that the creep has not been finished, the process returns to the step 1801. If a decision is made in the step 1805 that the creep has been finished, in a step 1806, a target clutch transmission torque is calculated, and in a step 1807, a decision is made whether or not the calculated target clutch transmission torque is equal to or smaller than "0". If a decision is made that the calculated target clutch transmission torque is equal to or smaller than "0", in a step 1808, the lower limit value of the target clutch transmission value is set to "0".

FIG. 19 is a flowchart of calculation carried out by a creep execution request when the start clutch transmission torque is controlled by controlling the position of the start clutch.

Referring to FIG. 19, when a creep execution request is made in a step 1901, in the next step 1902, a target clutch transmission torque is read. In a step 1903, a start clutch target position is calculated from a control map 2001 shown in FIG. 20. If a creep execution request is not received in the step 1091, in a step 1904, a start clutch target position is calculated from the control map 2001 shown in FIG. 20, and in the step 1905, the calculated start clutch target position is output.

FIG. 21 is a flowchart of calculation of a start clutch hydraulic pressure carried out by a creep execution request when the start clutch transmission torque is controlled by controlling the start clutch hydraulic pressure.

Referring to FIG. 21, when a creep execution request is made in a step 2101, a target clutch transmission torque is read in a step 2102. In a step 2103, a target hydraulic pressure value of the start clutch is calculated from a control map 2201 shown in FIG. 22, and the process proceeds to a step 2105. If a creep execution request is not received in the step 2101, in the next step 2104, a hydraulic pressure value of the start clutch is calculated from the control map 2201 shown in FIG. 22, and in a step 2105, the calculated target value of the start clutch hydraulic pressure is output.

FIG. 23 is a control map for obtaining a throttle angle when a creep execution request is made.

Referring to FIG. 23, if a creep execution request is made in a step 2301, in the next step 2302, a target engine speed NeRef is read, and in a step 2303, an engine speed Ne detected by the engine speed sensor 2 is read. After the engine speed Ne is read in the step 2303, in a step 2304, a deviation of the engine speed Ne detected by the engine speed sensor 2 from the target engine speed NeRef is calculated, and in a step 2305, a target engine torque is calculated, and the process proceeds to a step 2307.

On the other hand, if a creep execution request is not received in the step 2301, a target engine torque is calculated in a step 2306, and in a step 2307, a target throttle angle is obtained from the engine speed Ne and the calculated target engine torque by using a control map shown in FIG. 24. Then in a step 2308, the target throttle angle obtained is output to the electronic controlled throttle 3.

FIG. 25 is another control flowchart for obtaining a throttle angle when a creep execution request is made.

Referring to FIG. 25, when a creep execution request is made in a step 2501, a target clutch transmission torque is read in a step 2502, and in the next step 2503, a target engine torque is calculated from the read target clutch transmission torque, and the process proceeds to a step 2505.

If a creep execution request is not received in the step 2501, when a target engine torque is calculated in a step 2504, an engine speed Ne detected by the engine speed sensor 2 is read in a step 2505, and in a step 2506, a target throttle angle is obtained from the engine speed Ne and the calculated target engine torque by using a control map 2601 shown in FIG. 26, and then in a step 2507, the obtained target throttle angle value is output to the electronic controlled throttle 3.

FIG. 27 is a process flowchart until the end of creep execution when a creep execution request is made.

Referring to FIG. 27, if a creep execution request is made in a step 2701, a target creep torque value is read in a step 2702, and in the next step 2703, a target clutch transmission torque value is read, and then in a step 2704, a decision is made whether or not the read target clutch transmission torque value is equal to the target clutch transmission torque value. If a decision is made in the step 2704 that the read target creep torque value is equal to the target creep torque value, a creep finished flag is set in the step 2705. If a decision is made in the step 2704 that the read target creep torque value is not equal to the target clutch transmission torque value, in a step 2706, the creep finished flag is reset.

FIG. 28 is another process flowchart until the end of creep execution when a creep execution request is made.

Referring to FIG. 28, when a creep execution request is made, the vehicle speed Vsp is read in a step 2802, and in a step 2803, a decision is made whether or not the vehicle speed Vsp that was read is equal to or greater than the creep vehicle speed VspCrp. If a decision is made in the step 2803 that the read vehicle speed Vsp is equal to or greater than the creep vehicle speed VspCrp, a creep finished flag is set (ON) in a step 2804. If a decision is made in the step 2803 that the read vehicle speed Vsp is smaller than the creep vehicle speed VspCrp, a creep finished flag is reset (OFF) in a step 2805.

FIG. 29 is yet another process flowchart until the end of creep execution when a creep execution request is made.

Referring to FIG. 29, if a creep execution request is made in a step 2901, a creep execution duration t is read in a step 2902 which represents a duration during which the creep execution request is ON, and in a step 2903, a decision is made whether or not the read creep execution duration t is equal to or longer than the creep duration tCrp. If a decision is made in the step 2903 that the read creep execution duration t is equal to or longer than the creep duration tCrp, a creep finished flag is set in a step 2904. If a decision is made in the step 2903 that the read creep execution duration t is shorter than the creep duration tCrp, a creep finished flag is reset (OFF) in a step 2905.

A decision about the end of creep control may be made formed by taking into account the position, hydraulic pressure, and electric current of the clutch, or the revolution speed of the transmission output shaft and so on.

Though not illustrated in FIGS. 1, 8 and 9, a reverse gear may be provided to reverse the vehicle and this invention may be arranged so that start control shown in FIGS. 3 to 6 and creep control shown in FIGS. 12 to 29 may be performed when reversing the vehicle.

According to the present invention, it is possible to suppress changes in acceleration, and improve the gear shifting performance of the automatic transmission at stating and gear shifting.

Further, according to the present invention, it is possible to secure a starting performance by generating creep torque, and prevent a temperature rise and deterioration of the clutch attributable to a continuous slip.

What is claimed is:

1. A method for controlling an automotive vehicle having a first clutch mounted between an engine and a gear drive transmission, for connecting or disconnecting torque transmitted from said engine to driving wheels, and a torque transmission disposed between an input shaft and an output shaft of said gear drive transmission, wherein said torque transmission is of the dog clutch type, and wherein said first clutch is controlled at starting the vehicle or at gear shifting, thereby to continuously increase a transmission torque of said first clutch to said input shaft of said gear drive transmission, said method comprising the steps of:

upon starting the vehicle, controlling the transmission torque of said first clutch to increase a quantity of increase in a transmission torque of said first clutch in proportion to a difference between an engine speed and an input shaft revolution speed; and controlling a torque of said engine based on the transmission torque of said first clutch so as to increase the torque of said engine according to an increase in the transmission torque of said first clutch.

2. A method for controlling an automotive vehicle according to claim 1, wherein the transmission torque of said first clutch is controlled by a hydraulic pressure to drive said first clutch.

3. A method for controlling an automotive vehicle according to claim 1, wherein the transmission torque of said first clutch is controlled by a length of stroke to drive said first clutch.

4. A method for controlling an automotive vehicle having a first clutch mounted between an engine and a gear drive transmission, for connecting or disconnecting torque transmitted from said engine to driving wheels, and a torque transmission disposed between an input shaft and an output shaft of said gear drive transmission, wherein said torque transmission is of the dog clutch type, and wherein said first clutch is controlled at starting the vehicle or at gear shifting, thereby to continuously increase a transmission torque of said first clutch to said input shaft of said gear drive transmission, said method comprising the steps of:

upon starting the vehicle, controlling the transmission torque of said first clutch in proportion to a difference between an engine speed and a revolution speed of the transmission input shaft, wherein the transmission torque of said first clutch is held in a specified range when a difference between the engine speed and the revolution speed of said input shaft has reached a specified value.

5. A control system for an automotive vehicle having a first clutch mounted between an engine and a gear drive transmission, for connecting or disconnecting torque transmitted from the engine to driving wheels, and a torque transmission disposed between an input shaft and an output shaft of the gear drive transmission, wherein said torque transmission is of the dog clutch type, and wherein said first clutch is controlled at starting the vehicle or at gear shifting, thereby to continuously increase a transmission torque of said first clutch to said input shaft of said gear drive transmission, said control system comprising:

a clutch control means for, upon starting the vehicle, controlling the transmission torque of said first clutch to increase a quantity of increase in transmission torque of said first clutch in proportion to a difference between an engine speed and an input shaft revolution speed; and an engine torque control means for controlling the engine torque based on the transmission torque of said first clutch so as to increase the engine torque according to an increase in the transmission torque of said first clutch.

6. A method for controlling an automotive vehicle having a first clutch mounted between an engine and a gear drive transmission, for connecting or disconnecting torque transmitted from an engine to driving wheels, and a torque transmission disposed between an input shaft and an output shaft of said gear drive transmission, wherein said torque transmission is of the dog clutch type, and wherein said first clutch is controlled at starting the vehicle or at gear shifting, thereby to continuously increase a transmission torque of said first clutch to said input shaft of said gear drive transmission, said method comprising the steps of:

upon gear shifting, controlling the transmission torque of said first clutch to increase a quantity of increase in a transmission torque of said first clutch in proportion to a difference between an engine speed and a revolution speed of said input shaft; and controlling a torque of said engine based on the transmission torque of said first clutch so as to increase the torque of said engine according to an increase in the transmission torque of said first clutch.

7. A method for controlling an automotive vehicle according to claim 6, wherein the transmission torque of said first clutch is controlled by a hydraulic pressure to drive said first clutch.

8. A method for controlling an automotive vehicle according to claim 6, wherein the transmission torque of said first clutch is controlled by a length of stroke to drive said first clutch.

9. A method for controlling an automotive vehicle having a first clutch mounted between an engine and a gear drive transmission, for connecting or disconnecting torque transmitted from an engine to driving wheels, and a torque transmission disposed between an input shaft and an output shaft of said gear drive transmission, wherein said torque transmission is of the dog clutch type, and wherein said first clutch is controlled at starting the vehicle or at gear shifting, thereby to continuously increase a transmission torque of said first clutch to said input shaft of said gear drive transmission, said method comprising the steps of:

upon gear shifting, controlling the transmission torque of said first clutch in proportion to a difference between an engine speed and a revolution speed of the input shaft, wherein the transmission torque of said first clutch is held in a specified range when a difference between the engine speed and the revolution speed of said input shaft has reached a specified value.

10. A control system for an automotive vehicle having a first clutch mounted between an engine and a gear drive transmission, for connecting or disconnecting torque transmitted from the engine to driving wheels, and a torque transmission disposed between an input shaft and an output shaft of the gear drive transmission, wherein said torque transmission is of the dog clutch type, and wherein said first clutch is controlled at starting the vehicle or at gear shifting, thereby to continuously increase a transmission torque of said first clutch to said input shaft of said gear drive transmission, said control system comprising:

a clutch control means for, upon gear shifting, controlling the transmission torque of the first clutch to increase a quantity of increase in transmission torque of said first clutch in proportion to a difference between an engine speed and an input shaft revolution speed; and an engine torque control means for controlling the engine torque based on the transmission torque of said first clutch so as to increase the engine torque according to an increase in the transmission torque of said first clutch.

* * * * *